(12) United States Patent
Yamada

(10) Patent No.: US 11,353,695 B2
(45) Date of Patent: Jun. 7, 2022

(54) ACTUATOR AND OPTICAL SCANNING DEVICE

(71) Applicant: Tsukasa Yamada, Tokyo (JP)

(72) Inventor: Tsukasa Yamada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 304 days.

(21) Appl. No.: 16/279,175

(22) Filed: Feb. 19, 2019

(65) Prior Publication Data

US 2019/0265462 A1     Aug. 29, 2019

(30) Foreign Application Priority Data

Feb. 23, 2018 (JP) .............................. JP2018-030890

(51) Int. Cl.
*G02B 26/10* (2006.01)
*G02B 26/08* (2006.01)
*H02N 2/10* (2006.01)

(52) U.S. Cl.
CPC ......... *G02B 26/10* (2013.01); *G02B 26/0858* (2013.01); *H02N 2/10* (2013.01)

(58) Field of Classification Search
CPC .. G02B 26/10; G02B 26/0858; G02B 26/105; G02B 26/101; G02B 26/0841; G02B 26/0816; G02B 26/0833; G02B 26/08; G02B 26/085; H02N 2/10; H04N 1/1135; H04N 1/113; B81B 7/0006; B81B 3/0045
See application file for complete search history.

(56) References Cited

U.S. PATENT DOCUMENTS

| | | | | |
|---|---|---|---|---|
| 2012/0162739 A1* | 6/2012 | Yamada | ............... | G02B 26/101 359/212.1 |
| 2013/0083378 A1* | 4/2013 | Tanaka | ................. | G02B 26/101 359/199.4 |
| 2013/0083382 A1* | 4/2013 | Sekine | ................ | H01L 41/0475 359/224.1 |

(Continued)

FOREIGN PATENT DOCUMENTS

| | | |
|---|---|---|
| JP | 2010-148265 | 7/2010 |
| JP | 2012-133242 | 7/2012 |

(Continued)

OTHER PUBLICATIONS

Office Action dated Nov. 16, 2021 with respect to the corresponding Japanese patent application No. 2018-030890.

*Primary Examiner* — Ephrem Z Mebrahtu
(74) *Attorney, Agent, or Firm* — IPUSA, PLLC

(57) ABSTRACT

An actuator includes: a first drive beam provided to swing and drive a target object around a first axis and having a first drive source on a front surface; a second drive beam that has a zigzag shape, in which a plurality of beams extending in a direction vertical to a second axis orthogonal to the first axis are included and in which end portions of the beams adjacent with each other are connected at turn portions, and that is provided to swing and drive the object around the second axis, and having a second drive source on a front surface; a fixed frame connected to and support the second drive beam; and a rib formed on a back surface of the second drive beam and at a position away from a connection position of the beams with the turn portions toward the second axis.

13 Claims, 27 Drawing Sheets

(56) References Cited

U.S. PATENT DOCUMENTS

| | | | |
|---|---|---|---|
| 2015/0277107 A1* | 10/2015 | Aimono | G02B 26/0858 |
| | | | 359/198.1 |
| 2017/0153444 A1* | 6/2017 | Hino | G03B 21/006 |
| 2019/0285886 A1* | 9/2019 | Yamashiro | H04N 1/047 |

FOREIGN PATENT DOCUMENTS

| | | |
|---|---|---|
| JP | 2014-235298 | 12/2014 |
| JP | 2015-215562 | 12/2015 |

\* cited by examiner

ACTUATOR AND OPTICAL SCANNING DEVICE

CROSS-REFERENCE TO RELATED APPLICATION

The present application is based on and claims priority to Japanese Application No. 2018-030890 filed on Feb. 23, 2018, the entire contents of which are hereby incorporated by reference.

BACKGROUND OF THE INVENTION

1. Field of the Invention

The present invention relates to an actuator and an optical scanning device.

2. Description of the Related Art

Conventionally, an optical scanning device is known that scans light by rotating a mirror portion around a rotation axis by a drive beam. One example of such an optical scanning device is a piezoelectric type biaxial drive MEMS mirror. In such a piezoelectric type biaxial drive MEMS mirror, an oscillation of a horizontal drive beam during resonance drive of the horizontal drive beam propagates to a vertical drive beam, and a resonance oscillation of the vertical drive beam is excited, whereby mechanical crosstalk occurs between the horizontal drive beam and the vertical drive beam. The cause of the mechanical crosstalk is oscillation excitation in the vertical direction orthogonal to the horizontal direction during horizontal drive.

Upon mechanical crosstalk occurring, the vertical drive beam oscillates by merely driving the horizontal drive beam, and an oscillation component occurs in the vertical direction. Also, upon mechanical crosstalk occurring, scanning light has a vertical oscillation component and deteriorates the quality of emitted light.

Mechanical crosstalk also occurs due to a variation in the resonance frequency due to a manufacturing variation or a resonance frequency fluctuation caused by a change in the Young's modulus of a MEMS structure due to a temperature change.

In order to suppress mechanical crosstalk, it is required to suppress a vertical fluctuation of a mirror reflecting surface or a movable frame suspended by a vertical drive beam during horizontal resonance drive.

As one technique for preventing the scanning locus of an optical scanning device from being disturbed, an optical scanning device has a rib on an outer driving portion for causing a reflecting portion to perform twisting oscillation (see, for example, Patent Document 1).

RELATED-ART DOCUMENT

Patent Document

[Patent Document 1] Japanese Laid-open Patent Publication No. 2015-215562

However, it is required to further suppress occurrence of mechanical crosstalk in an optical scanning device as described above.

In view of the above, an object of the present invention is to suppress occurrence of mechanical crosstalk in an actuator constituting an optical scanning device or the like.

SUMMARY OF THE INVENTION

According to one aspect of the present invention, an actuator includes:

a first drive beam (150A, 150B) provided to be able to swing and drive a target object (120) around a first axis (H), a first drive source (151A, 151B) being formed on a front surface of the first drive beam; a second drive beam (170A, 170B) that has a bellows structure of a zigzag shape as a whole, in which a plurality of beams (vertical beams 173X1 to 173X6, 173Y1 to 173Y6) extending in a direction vertical to a second axis (V) orthogonal to the first axis are included and in which end portions of the beams adjacent with each other are connected at turn portions (171X1 to 171X5, 171Y1 to 171Y5), and that is provided to be able to swing and drive the target object around the second axis, a second drive source (171A,171B) being formed on a front surface of the second drive beam; a fixed frame (180) connected to the second drive beam to support the second drive beam; and a rib (175X, 175Y) formed on a back surface of the second drive beam and at a position away from a connection position of the beams with the turn portions toward the second axis.

Note that the reference numerals in the above-described parentheses are attached to facilitate understanding; these are merely examples, and the depicted aspects are not limiting.

Advantageous Effects of Invention

According to the disclosed technique, it is possible to suppress occurrence of mechanical crosstalk in an actuator.

BRIEF DESCRIPTION OF THE DRAWINGS

FIGS. 15A and 15B are schematic diagrams of photographs of a laser irradiation surface when laser is scanned with a single horizontal axis in which FIG. 15A illustrates a case where mechanical crosstalk does not occur, and FIG. 15B illustrates a case where mechanical crosstalk occurs;

DETAILED DESCRIPTION OF THE EMBODIMENTS

Figure 1:
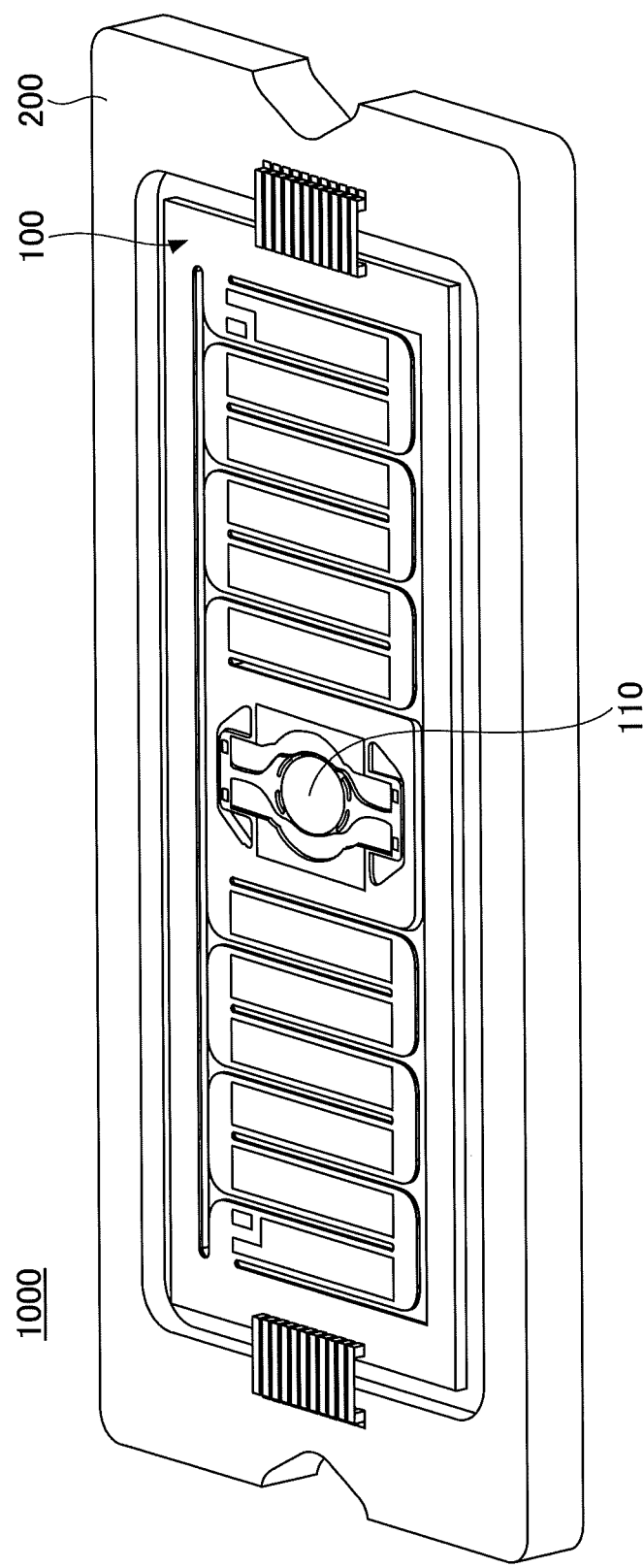
FIG. 1 is a perspective view (1) illustrating an example of an optical scanning device according to an embodiment.

In the following, an embodiment of the present invention will be described with reference to the drawings. Throughout the drawings, same reference numerals are given to same elements, and duplicated descriptions may be omitted as appropriate.

Embodiment

Figure 2:
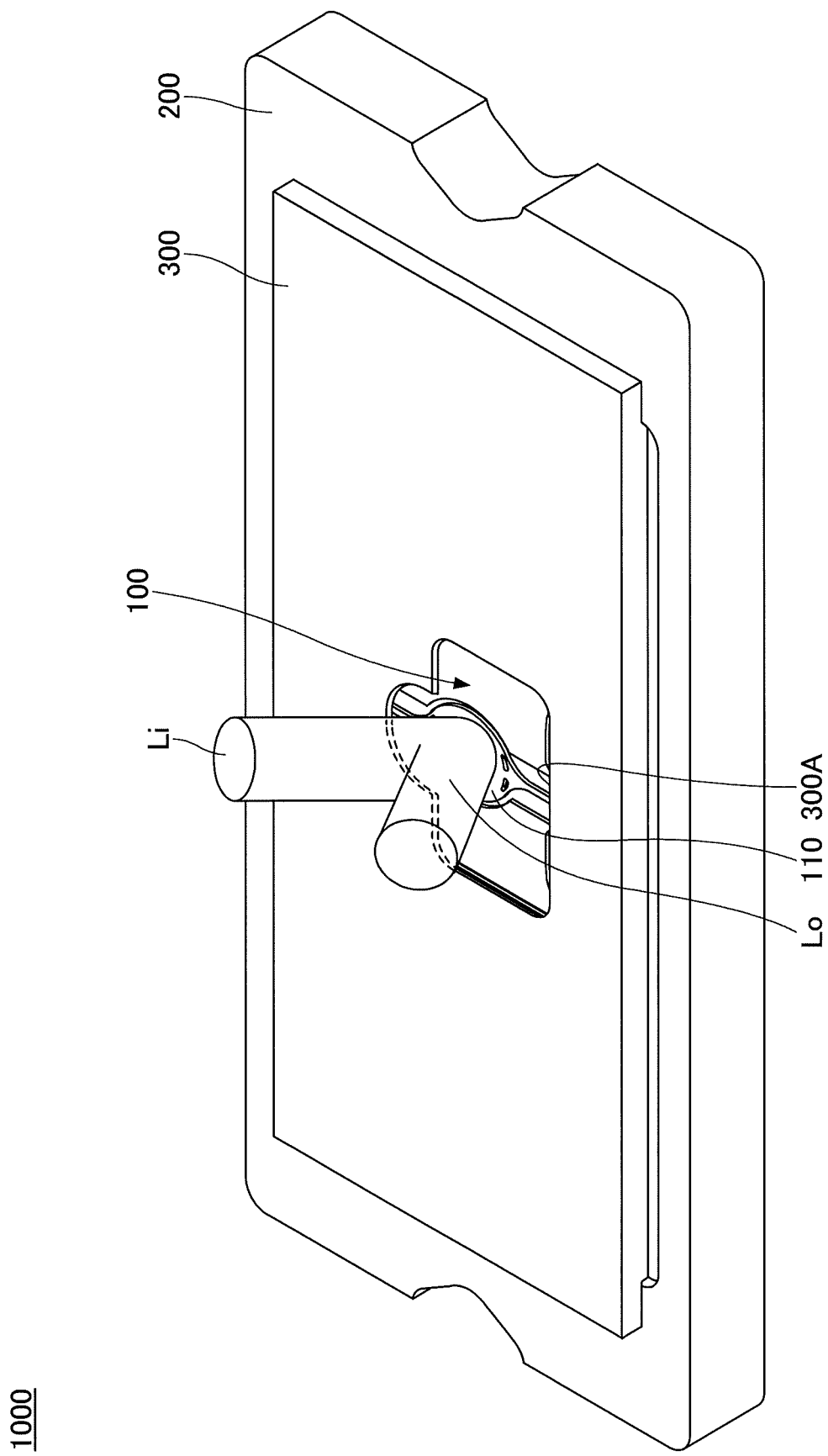
FIG. 2 is a perspective view (2) illustrating an example of the optical scanning device according to the embodiment.

First, an optical scanning device 1000 according to an embodiment will be described. FIG. 1 and FIG. 2 are perspective views illustrating an example of the optical scanning device 1000 according to the embodiment. FIG. 1 illustrates the optical scanning device 1000 in a state in which a package cover 300 is detached. FIG. 2 illustrates the optical scanning device 1000 in a state in which the package cover 300 is attached.

As illustrated in FIG. 1 and FIG. 2, the optical scanning device 1000 includes an optical scanning unit 100, a ceramic package 200 on which the optical scanning unit 100 is mounted, and the package cover 300 that is arranged on the ceramic package 200 and that covers the optical scanning unit 100. The optical scanning device 1000 may include a substrate, a control circuit, etc., on a lower side of the ceramic package 200.

In the optical scanning device 1000, at substantially the center part of the package cover 300, an opening 300A is provided from which the vicinity of a mirror 110 that has an optical reflection surface is exposed. It is assumed that the opening 300A has a shape such that incident laser light Li that is incident onto the mirror 110 and outgoing laser light Lo (scanning light) are not blocked.

It should be noted that, in the opening 300A, the side, through which the incident laser light Li passes, has a smaller opening than that of the side through, which the outgoing laser light Lo passes. In other words, the incident laser light Li side of the opening 300A has a smaller opening with a substantially semicircular shape, and the outgoing laser light Lo side of the opening 300A has a larger opening with a substantially rectangle shape. This is because the incident laser light Li enters from a fixed direction, and thus, the opening should be provided only for the fixed direction. On the other hand, the outgoing laser light Lo is scanned in two dimensions, and thus, the opening is required to be provided for the entire range to be scanned so that the outgoing laser light Lo, which is scanned in two dimensions, is not blocked.

Figure 3:
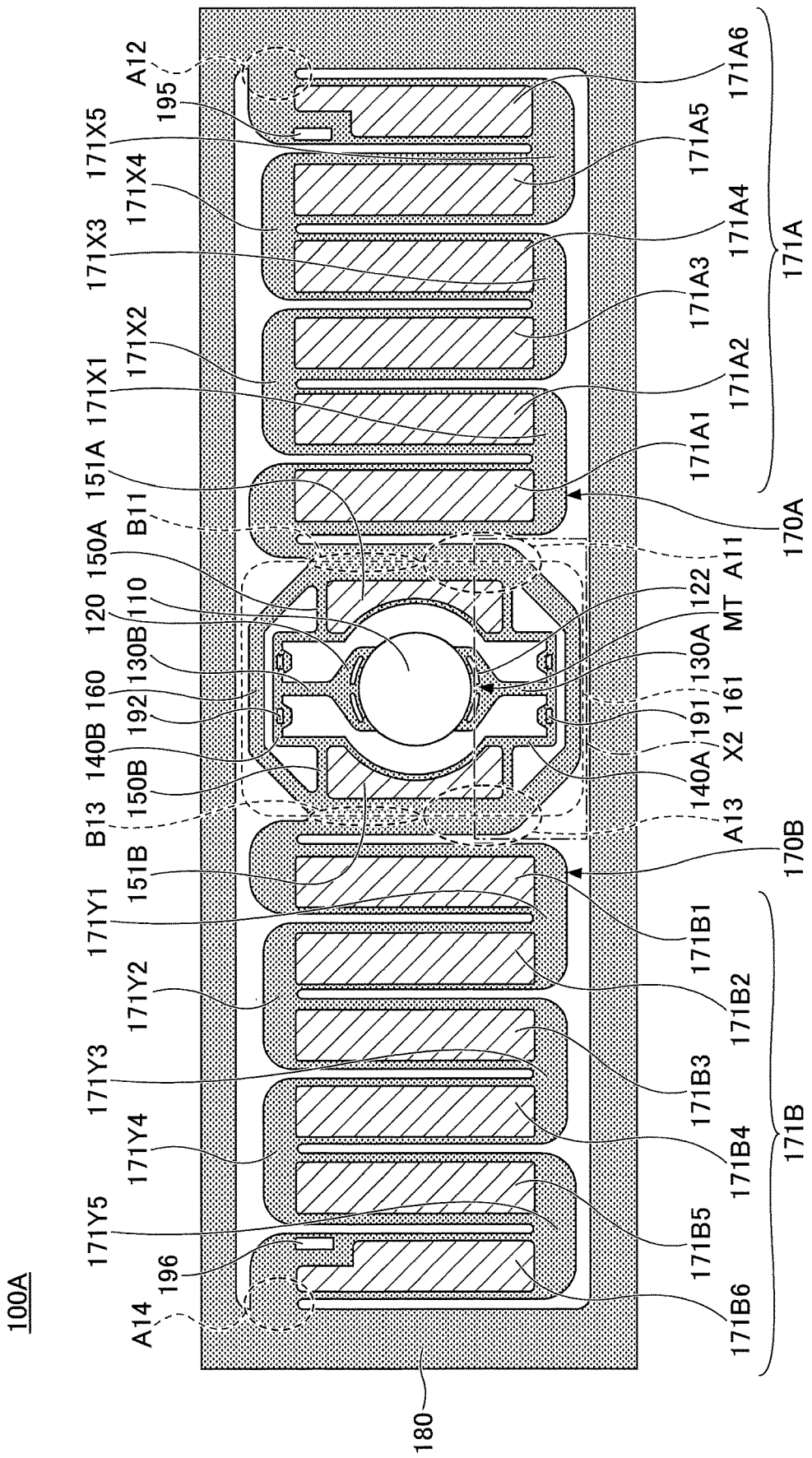
FIG. 3 is an upper surface side plan view illustrating an example of an optical scanning unit of the optical scanning device according to the embodiment.
Figure 4:
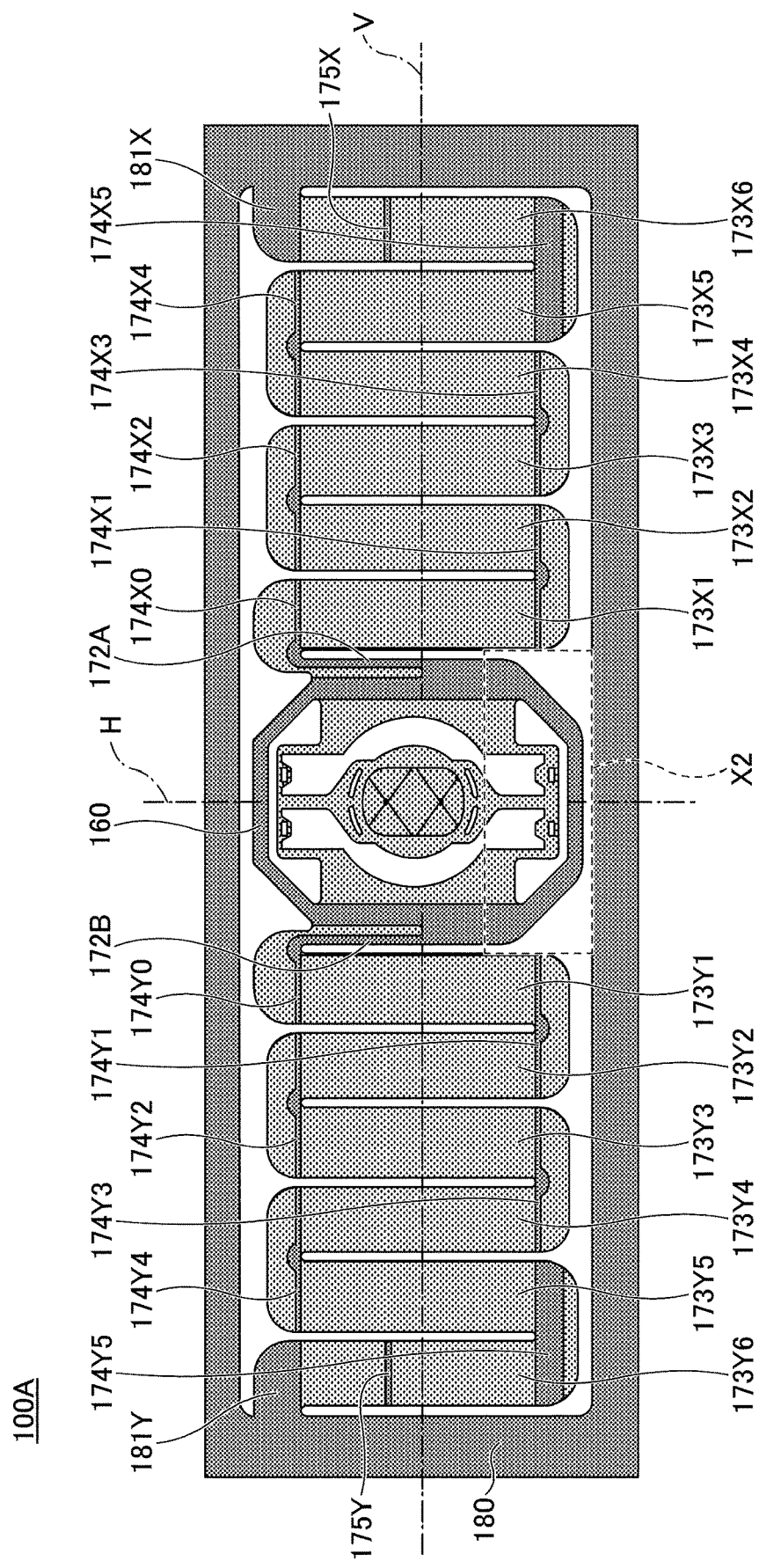
FIG. 4 is a lower surface side plan view illustrating an example of the optical scanning unit of the optical scanning device according to the embodiment.

Next, the optical scanning unit 100 of the optical scanning device 1000 will be described. FIG. 3 is an upper surface side plan view illustrating an example of an optical scanning unit 100A of the optical scanning device 1000 according to the embodiment. FIG. 4 is a lower surface side plan view illustrating an example of the optical scanning unit 100A of the optical scanning device 1000 according to the embodiment.

As illustrated in FIG. 3 and FIG. 4, the optical scanning unit 100A is a portion that scans laser light emitted from a light source by swinging the mirror 110. The optical scanning unit 100A may be, for example, a MEMS (Micro Electro Mechanical Systems) mirror that drives the mirror 110 by using a piezoelectric element.

The optical scanning unit 100A includes the mirror 110, a mirror support unit 120, twist beams 130A and 130B, connection beams 140A and 140B, horizontal drive beams 150A and 150B, the movable frame 160, the vertical drive beams 170A and 170B, and the fixed frame 180. The mirror 110 is supported on the upper surface of the mirror support unit 120. In the present embodiment, the mirror support unit 120, the twist beams 130A and 130B, the connection beams 140A and 140B, the horizontal drive beams 150A and 150B, and the movable frame 160 are collectively referred to as a mirror support 161 that supports the mirror 110.

On both sides of the mirror support 161, a pair of vertical drive beams 170A and 170B, which are connected to the mirror support 161, are disposed. The mirror support 161 and the vertical drive beam 170A are connected by a mirror support connection portion A11. The fixed frame 180 and the vertical drive beam 170A are connected by a fixed frame connection portion A12. The mirror support 161 and the vertical drive beam 170B are connected by a mirror support connection portion A13. The fixed frame 180 and the vertical drive beam 170B are connected by a fixed frame connection portion A14. Details of the vertical drive beams 170A and 170B will be described later below.

On both sides of the mirror support unit 120 that supports the mirror 110, the pair of horizontal drive beams 150A and 150B, which are connected to the mirror support unit 120, are disposed. Also, the horizontal drive beams 150A and 150B, the connection beams 140A and 140B, the twist beams 130A and 130B, the mirror support unit 120, and the mirror 110 are supported by the movable frame 160 from outside. That is, one side of the horizontal drive beam 150A and one side of the horizontal drive beam 150B are connected to and supported by the movable frame 160. The other side of the horizontal drive beam 150A extends toward the inner periphery and is connected to the connection beams 140A and 140B. Similarly, the other side of the horizontal drive beam 150B extends toward the inner periphery and is connected to the connection beams 140A and 140B. The connection beams 140A and 140B are connected to the twist beams 130A and 130B that extend in the direction of the horizontal rotation axis H, and the twist beams 130A and 130B support the mirror support unit 120 from both sides in the direction of the horizontal rotation axis H. As described above, the horizontal drive beams 150A and 150B are provided as a pair in a direction orthogonal to the direction of the horizontal rotation axis H, in which the twist beams 130A and 130B extend, in such a way that the mirror 110 and the mirror support unit 120 are sandwiched by the horizontal drive beams 150A and 150B. The direction of the horizontal rotation axis H will be described later below.

The horizontal drive beams 150A and 150B include horizontal drive sources 151A and 151B, respectively. Further, the vertical drive beams 170A and 170B include vertical drive sources 171A and 171B, respectively. The horizontal drive beams 150A and 150B, the vertical drive beams 170A and 170B, and the fixed frame 180, which are connected to the vertical drive beams 170A and 170B, function as actuators that swing the mirror 110 in an up-and-down direction (vertical direction) and in a left-and-right direction (horizontal direction) to scan laser light.

The horizontal drive sources 151A and 151B are formed on the upper surfaces of the horizontal drive beams 150A and 150B, respectively. The horizontal drive sources 151A and 151B include upper electrodes formed on thin films of piezoelectric elements (hereinafter, which may be referred to as "piezoelectric thin films") on the upper surfaces of the horizontal drive beams 150A and 150B, and lower electrodes formed on the piezoelectric thin films. The horizontal drive sources 151A and 151B expand and contract according to the polarity of a drive voltage applied to the upper electrodes and the lower electrodes.

Therefore, by applying, to the horizontal drive beam 150A and the horizontal drive beam 150B, drive voltages of sine waves that have opposite phases, the horizontal drive beam 150A and the horizontal drive beam 150B, disposed on the left side and the right side of the mirror 110, alternately oscillate in opposite vertical directions. According to this operation, it is possible to swing (rotate) the mirror 110 around the twist beams 130A and 130B as a swing axis or a rotational axis in the direction of the horizontal rotation axis H. The direction, in which the mirror 110 swings around the twist beams 130A and 130B as an axis, is referred to as the horizontal direction, and the swing axis that passes through the center C of the optical reflection surface of the mirror 110 is referred to as the horizontal rotation axis H. Resonance oscillation, for example, can be used for the horizontal drive by the horizontal drive beams 150A and 150B such that the mirror 110 can be driven to swing at high speed.

In the mirror support unit 120, slits 122 are formed along the circumference of the mirror 110. According to the slits 122, not only the weight of the mirror support unit 120 can be reduced, but also the twisting caused by the twist beams 130A and 130B can be transmitted to the mirror 110.

Also, as illustrated in FIG. 3 and FIG. 4, the vertical drive beam 170A has a zigzag shape (bellows structure) as a whole in which a plurality of vertical beams extending in the direction of the horizontal rotation axis H are included and in which the end portions of the adjacent vertical beams are connected with each other.

For example, the end portion of the first vertical beam counted from the mirror support 161 side and the end portion of the second vertical beam are connected by a turn portion 171X1. Also, the end portion of the second vertical beam and the end portion of the third vertical beam are connected by a turn portion 171X2. Also, the end portion of the third vertical beam and the end portion of the fourth vertical beam are connected by a turn portion 171X3. Also, the end portion of the fourth vertical beam and the end portion of the fifth vertical beam are connected by a turn portion 171X4. Also, the end portion of the fifth vertical beam and the end portion of the sixth vertical beam are connected by a turn portion 171X5.

Similarly, the vertical drive beam 170B has a zigzag shape (bellows structure) as a whole in which a plurality of vertical beams extending in the direction of the horizontal rotation axis H are included and in which the end portions of the adjacent vertical beams are connected with each other.

For example, the end portion of the first vertical beam counted from the mirror support 161 side and the end portion of the second vertical beam are connected by a turn portion 171Y1. Also, the end portion of the second vertical beam and the end portion of the third vertical beam are connected by a turn portion 171Y2. Also, the end portion of the third vertical beam and the end portion of the fourth vertical beam are connected by a turn portion 171Y3. Also, the end portion of the fourth vertical beam and the end portion of the fifth vertical beam are connected by a turn portion 171Y4. Also, the end portion of the fifth vertical beam and the end portion of the sixth vertical beam are connected by a turn portion 171Y5.

On the upper surfaces of the vertical drive beams 170A and 170B, the vertical drive sources 171A and 171B are formed for respective vertical beams that are rectangle units that do not include curved portions. The vertical drive source 171A includes an upper electrode formed on a piezoelectric thin film on the upper surface of the vertical drive beam 170A, and a lower electrode formed on the lower surface of the piezoelectric thin film. The vertical drive source 171B includes an upper electrode formed on a piezoelectric thin film on the upper surface of the vertical drive beam 170B, and a lower electrode formed on the lower surface of the piezoelectric thin film.

The vertical drive beams 170A and 170B cause the vertical drive sources 171A and 171B that are adjacent for respective adjacent vertical beams to apply drive voltages that have polarities vertically reversed with reference to the drive waveform central value to change deformation amounts in the upward direction of the adjacent vertical beams and to transmit accumulated vertical movements of the vertical beams to the movable frame 160. This operation of the vertical drive beams 170A and 170B cause the mirror 110 and the mirror support 161 to swing in the direction orthogonal to the direction of the horizontal rotation axis H. This swinging direction is referred to as the vertical direction, and the light reflection of the mirror 110, and the swing axis passing through the center C of the optical reflection surface of the mirror 110 is referred to as the vertical rotation axis V. For example, non-resonant oscillation can be used for the vertical drive by the vertical drive beams 170A and 170B.

For example, the vertical drive source 171A includes six vertical drive sources 171A1, 171A2, 171A3, 171A4, 171A5, and 171A6 that are formed on the first to sixth respective vertical beams constituting the vertical drive beam 170A. Further, the vertical drive source 171B includes six vertical drive sources 171B1, 171B2, 171B3, 171B4, 171B5, and 171B6 that are formed on the first to sixth respective vertical beams constituting the vertical drive beam 170B. In this case, by driving the vertical drive sources 171A1, 171B1, 171A3, 171B3, 171A5, and 171B5 with a first same waveform voltage, and by driving the vertical drive sources 171A2, 171B2, 171A4, 171B4, 171A6, and 171B6 with a second same waveform, which is different from the first waveform, it is possible to swing the mirror 110 and the mirror support 61 in the vertical direction.

Further, the optical scanning unit 100A includes, as horizontal swing angle sensors, piezoelectric sensors 191 and 192 that detect a tilt degree in the horizontal direction (swing angle in the horizontal direction) of the mirror 110 in a state in which drive voltages are applied to the horizontal drive sources 151A and 151B and the mirror 110 swings in the horizontal direction. The piezoelectric sensor 191 is provided on the connection beam 140A, and the piezoelectric sensor 192 is provided on the connection beam 140B.

Further, the optical scanning unit 100A includes piezoelectric sensors 195 and 196 as vertical swing angle sensors that detect a tilt degree of the mirror 110 in the vertical direction (swing angle in the vertical direction) in a state where drive voltages are applied to the vertical drive sources 171A and 171B to swing the mirror 110 in the vertical direction. The piezoelectric sensor 195 is disposed on one of the vertical beams constituting the vertical drive beam 170A and the piezoelectric sensor 196 is disposed on one of the vertical beams constituting the vertical drive beam 170B.

In the optical scanning device according to the present embodiment, the optical scanning unit can be formed by using, for example, a SOI (Silicon On Insulator) substrate that includes an active layer, a BOX (Buried Oxide) film, and a support layer. The fixed frame 180, the movable frame 160 and ribs are constituted by the active layer, the buried oxide film and the support layer. On the other hand, the twist beams 130A and 130B, the horizontal drive beams 150A and 150B, and the vertical drive beams 170A and 170B are constituted by the active layer. Alternatively, the twist beams 130A and 130B, the horizontal drive beams 150A and 150B, and the vertical drive beams 170A and 170B may be constituted by the active layer and the buried oxide film. Accordingly, the fixed frame 180, the movable frame 160, and the ribs are portion heavier than the twist beams 130A and 130B, the horizontal drive beams 150A and 150B, and the vertical drive beams 170A and 170B.

In the optical scanning device according to the present embodiment, ribs are formed at connection positions of the vertical beams on the back surface of the vertical drive beam 170A. A rib 174X0 is formed at a position where the innermost vertical beam 173X1 is connected to the movable frame 160. A rib 174X1 is formed at a connection position of the vertical beams 173X1 and 173X2 with the turn portion 171X1. A rib 174X2 is formed at a connection position of the vertical beams 173X2 and 173X3 with the turn portion 171X2. A rib 174X3 is formed at a connection position of the vertical beams 173X3 and 173X4 with the turn portion 171X3. A rib 174X4 is formed at a connection position of the vertical beams 173X4 and 173X5 with the turn portion 171X4. A rib 174X5 is formed at a connection position of the vertical beams 173X5 and 173X6 with the turn portion 171X5. Here, the rib 174X5 is formed wide at the turn portion 171X5 side, and the connection position of the vertical beams 173X5 and 173X6 and the turn portion 171X5 is made heavier than the other connection positions.

Also, ribs are similarly formed at connection positions of the vertical beams on the back surface of the vertical drive beam 170B. A rib 174Y0 is formed at a position where the innermost vertical beam 173Y1 is connected to the movable frame 160. A rib 174Y1 is formed at a connection position of the vertical beams 173Y1 and 173Y2 with the turn portion 171Y1. A rib 174Y2 is formed at a connection position of the vertical beams 173Y2 and 173Y3 with the turn portion 171Y2. A rib 174Y3 is formed at a connection position of the vertical beams 173Y3 and 173Y4 with the turn portion 171Y3. A rib 174Y4 is formed at a connection position of the vertical beams 173Y4 and 173Y5 with the turn portion 171Y4. A rib 174Y5 is formed at a connection position of the vertical beams 173Y5 and 173Y6 with the turn portion 171Y5. Here, the rib 174Y5 is formed wide at the turn portion 171Y5 side, and the connection position of the vertical beams 173Y5 and 173Y6 and the turn portion 171Y5 is made heavier than the other connection positions.

In the optical scanning device according to the present embodiment, the connection position of the vertical beams 173X5 and 173X6 and the turn portion 171X5 and the connection position of the vertical beams 173Y5 and 173Y6 and the turn portion 171Y5 are made heavier as compared with the other connection positions. When the vertical drive beams resonantly oscillates, a phase delay occurs in the weighted turn portions, and a counter effect of suppressing oscillation of the other beams occurs.

Also, in the optical scanning device according to the present embodiment, the center of gravity of the mirror 110 and the mirror support 161 is located on the vertical rotation axis V. This is realized by the fact that the movable frame 160 is formed such that, with respect to the vertical rotation axis V, the opposite side of one side is heavier than the one side. That is, the area X2 side is formed to be heavier. Furthermore, in the optical scanning device of the present embodiment, which is capable of swinging the mirror 110 in the direction of the vertical rotation axis V and the direction of the horizontal rotation axis H as described above, the center of gravity of the mirror 110 and the mirror support unit 120 is located at the intersection point of the vertical rotation axis V with the horizontal rotation axis H. Thereby, the weight balance between the mirror 110 and the mirror support 161 is optimized, and an occurrence of ringing at the time of vertical drive can be suppressed.

In the optical scanning device according to the present embodiment, further, the ribs 175X and 175Y are formed on the back surfaces of the vertical drive beams 170A and 170B at positions away from the connection positions between the vertical beams and the turn portions toward the vertical rotation axis V. At least one rib is formed on at least one of the plurality of vertical beams. That is, the present embodiment has a configuration in which ribs are added to the back surfaces of deformation portions of the vertical drive beams 170A and 170B in a direction substantially orthogonal to the longitudinal direction of the vertical drive beams (vertical rotation axis direction). The deformation portions of the vertical drive beams 170A and 170B are rectangular vertical beams 173X1 to 173X6 and 173Y1 to 173Y6, which constitute the vertical drive beams 170A and 170B, and these portions are deformed in response to an applied drive voltage. In the present embodiment, ribs may be formed in two or more of the plurality of vertical beams. The rib(s) has a shape of being longer in the direction of the vertical rotation axis V and being shorter in the direction of the horizontal rotation axis H.

Also, the ribs are formed on the outermost beams among the plurality of vertical beams, that is, the ribs are formed on the vertical beams 173X6 and 173Y6 connected to the fixed frame 180 via the fixed frame connection portions A12 and A14 connected to the fixed frame 180. At least one of the ribs may be formed at positions away from the vertical rotation axis V on the outermost beams toward the fixed frame connection portions A12 and A14. As illustrated in FIG. 4, portions of the fixed frame 180 protruding from the fixed frame connection portions A12 and A14 toward the vertical beams 173X6 and 173Y6 are fixed portions 181X and 181Y. Similarly to the fixed frame 180, the fixed portions 181X and 181Y are formed by three layers that are the active layer, the buried oxide film, and the support layer of the SOI substrate, are heavier than the vertical drive beams 170A and 170B, and are starting points of oscillation of the vertical drive beams 170A and 170B. As the position of a rib is closer to the starting point of oscillation, the moment due to the rib mass decreases. Therefore, by arranging the ribs close to the fixed portions 181X and 181Y on the vertical beams 173X6 and 173Y6 that are the outermost beams, it is possible to prevent the resonance frequency of the vertical drive beams 170A and 170B from lowering.

Figure 5:
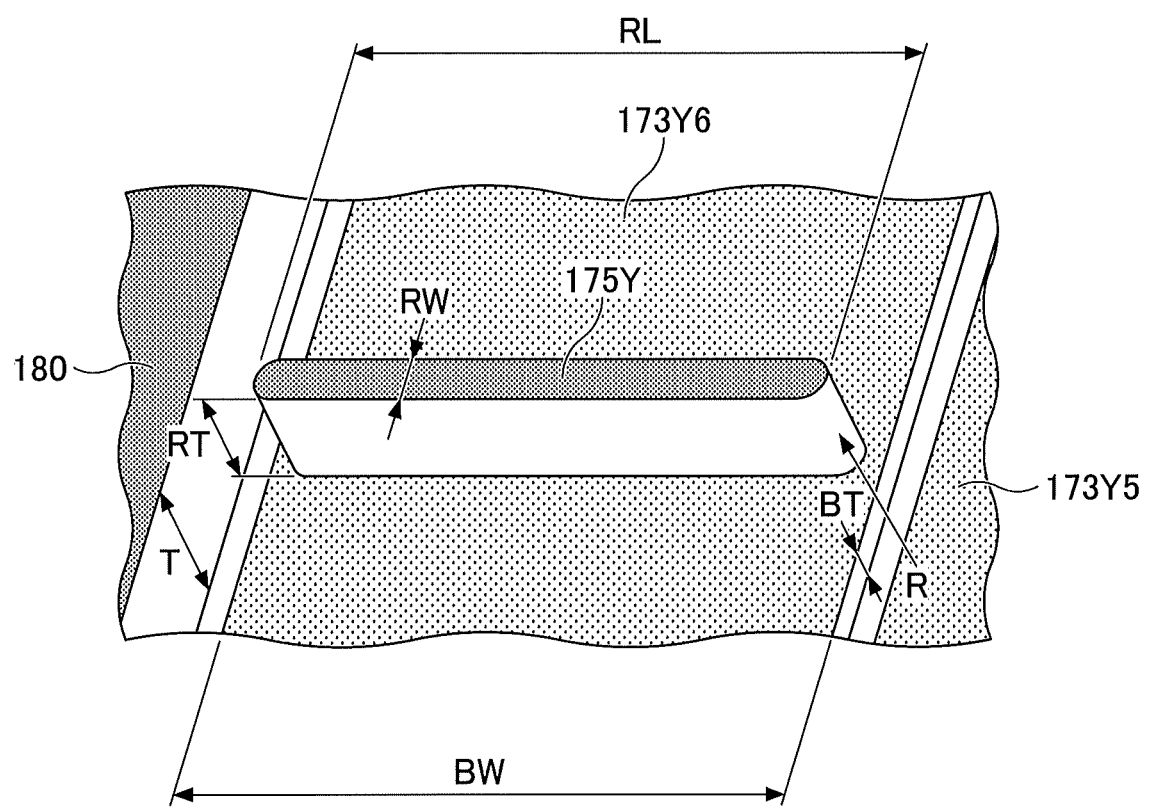
FIG. 5 is a perspective view enlarging a main portion of the optical scanning unit of the optical scanning device according to the embodiment.

By providing one or more ribs on the back surfaces of the deformation portions of the vertical drive beams, it is possible both to suppress the vertical direction fluctuation at the time of horizontal drive and to suppress the displacement/oscillation angle of f0 and f2 without affecting the horizontal resonance frequency and the vertical resonance frequency. Thus, it is possible to suppress mechanical crosstalk while suppressing ringing. Here, f0 and f2 the resonance frequencies in the normal mode (characteristic vibration mode), which correspond to the primary mode and the tertiary mode, respectively. Also, f0 and f2 refers to the normal mode at respective resonance frequencies FIG. 5 is a perspective view enlarging a main portion (a portion around the rib 175Y) of the optical scanning unit of the optical scanning device according to the embodiment. As the shape of the rib (175Y), it is assumed that the rib length in the direction of the vertical rotation axis V is RL, the rib width in the direction of the horizontal rotation axis H is RW, and the height of the rib from the surface of the vertical beam (173Y6) is RT.

A large f0/f2 oscillation angle causes ringing. With respect to f0, even when the oscillation angle can be suppressed, if there is a displacement, a vertical sensor output is generated and a false detection occurs in control. Therefore, the optimization range of the rib shape is determined by the f0 displacement and the f2 oscillation angle. Here, when the f0 displacement disappears, the f2 oscillation angle disappears. In the following, the rib shape dependence of the normalized f0 displacement amount and the f2 oscillation angle is calculated by simulation and indicated by a graph.

Figure 6:
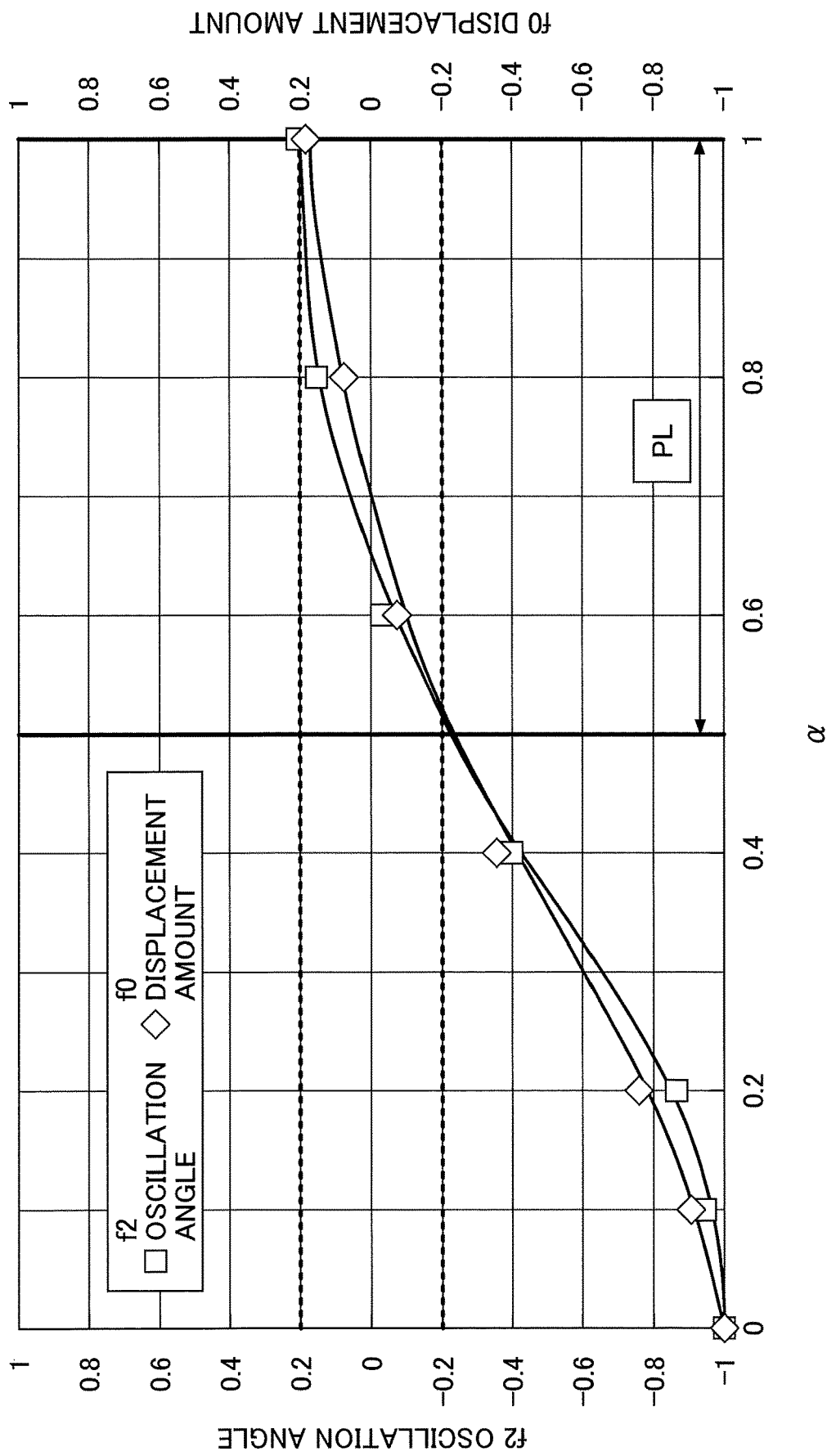
FIG. 6 is a diagram illustrating a relationship between, a f2 oscillation angle, a f0 displacement amount, and a length of a rib with respect to a beam width of the optical scanning unit of the optical scanning device according to the embodiment.

FIG. 6 is a diagram illustrating a relationship between, the f2 oscillation angle, the f0 displacement amount, and the length of the rib with respect to the beam width of the optical scanning unit of the optical scanning device according to the present embodiment. The horizontal axis in FIG. 6 is a coefficient $\alpha$ for when (rib length RL)=$\alpha \times$(beam width BW). When the normalized value of the f0 displacement amount is $0\pm0.2$ and the normalized value of the f2 oscillation angle is $0\pm0.2$, the permissible range PL permitted as the rib shape is $0.5 \times BW \leq RL \leq BW$. That is, if it is described by the coefficient $\alpha$ for when (rib length RL)=$\alpha \times$(beam width BW), $0.5 \leq \alpha \leq 1$.

Figure 7:
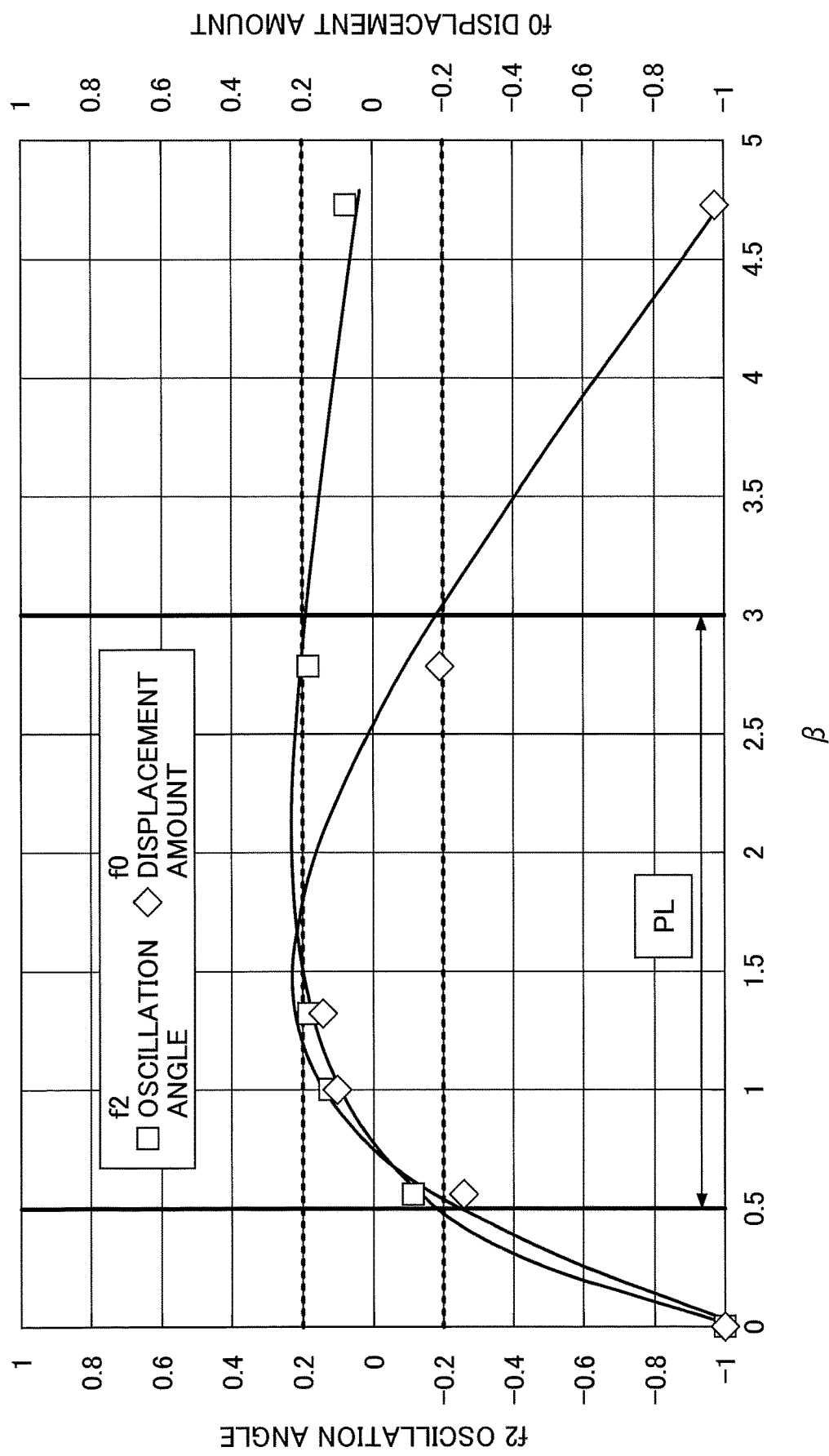
FIG. 7 is a diagram illustrating a relationship between, a f2 oscillation angle, a f0 displacement amount, and a width of a rib with respect to a beam thickness of the optical scanning unit of the optical scanning device according to the embodiment.

FIG. 7 is a diagram illustrating a relationship between, the f2 oscillation angle, the f0 displacement amount, and the width of the rib with respect to the beam thickness of the optical scanning unit of the optical scanning device according to the present embodiment. The horizontal axis in FIG. 7 is a coefficient $\beta$ for when (rib width RW)=$\beta \times$(beam thickness BT). When the normalized value of the f0 displacement amount is $0\pm0.2$ and the normalized value of the f2 oscillation angle is $0\pm0.2$, the permissible range PL permitted as the rib shape is $0.5 \times BW \leq RW \leq 3 \times BW$. That is, if it is described by the coefficient $\beta$ for when (rib width RW)=$\beta \times$(beam thickness BT), $0.5 \leq \beta \leq 3$.

Also, the horizontal drive beams 150A and 150B, the vertical drive beams 170A and 170B, the fixed frame 180 and the ribs 175X and 175Y are formed of the SOI substrate including the active layer, the buried oxide film, and the support layer. At this time, the rib height RT is equal to the sum of the thicknesses of the support layer and the buried oxide film. Assuming that the thickness of the SOI substrate is T and the thickness of the BOX film is sufficiently thin, the rib height RT can be said to be the thickness T of the SOI substrate−the beam thickness BT. That is, RT≈T−BT The ribs 175X and 175Y are substantially orthogonal to the longitudinal direction of the vertical beams and substantially parallel to the direction of the vertical rotation axis V. That is, each of the ribs 175X and 175Y has a shape of being long in the direction of the vertical rotation axis V and being short in the direction of the horizontal rotation axis H.

Also, as illustrated in FIG. 5, it is preferable that both end portions of the ribs 175X and 175Y in the direction of the vertical rotation axis V are formed in a round shape R such as an entire circular arc shape or a corner arc shape. This can prevent stress concentration of the BOX layer at the end portions of the ribs 175X and 175Y in the longitudinal direction (in the direction of the vertical rotation axis V).

FIRST REFERENCE EXAMPLE

A first reference example differs from the above described optical scanning device according to the present embodiment in the following three points, and others of the first reference example are similar to the optical scanning device according to the present embodiment. (1) The connection position of the vertical beams 173X5 and 173X6 and the turn portion 171X5 and the connection position of the vertical beams 173Y5 and 173Y6 and the turn portion 171Y5 are not made heavier as compared with the other connection positions. (2) In the movable frame 160, with respect to the vertical rotation axis V, the opposite side of one side is not heavier than the one side (the area X2 side is not formed to be heavier), and the center of gravity of the mirror 110 and the mirror support 120 is not located on the vertical rotation axis V. (3) On the back surfaces of the vertical drive beams 170A and 170B, the ribs 175X and 175Y are not formed at positions away from the connection positions of the vertical beams and the turn portions toward the vertical rotation axis V.

<Frequency Response>

Figure 8:
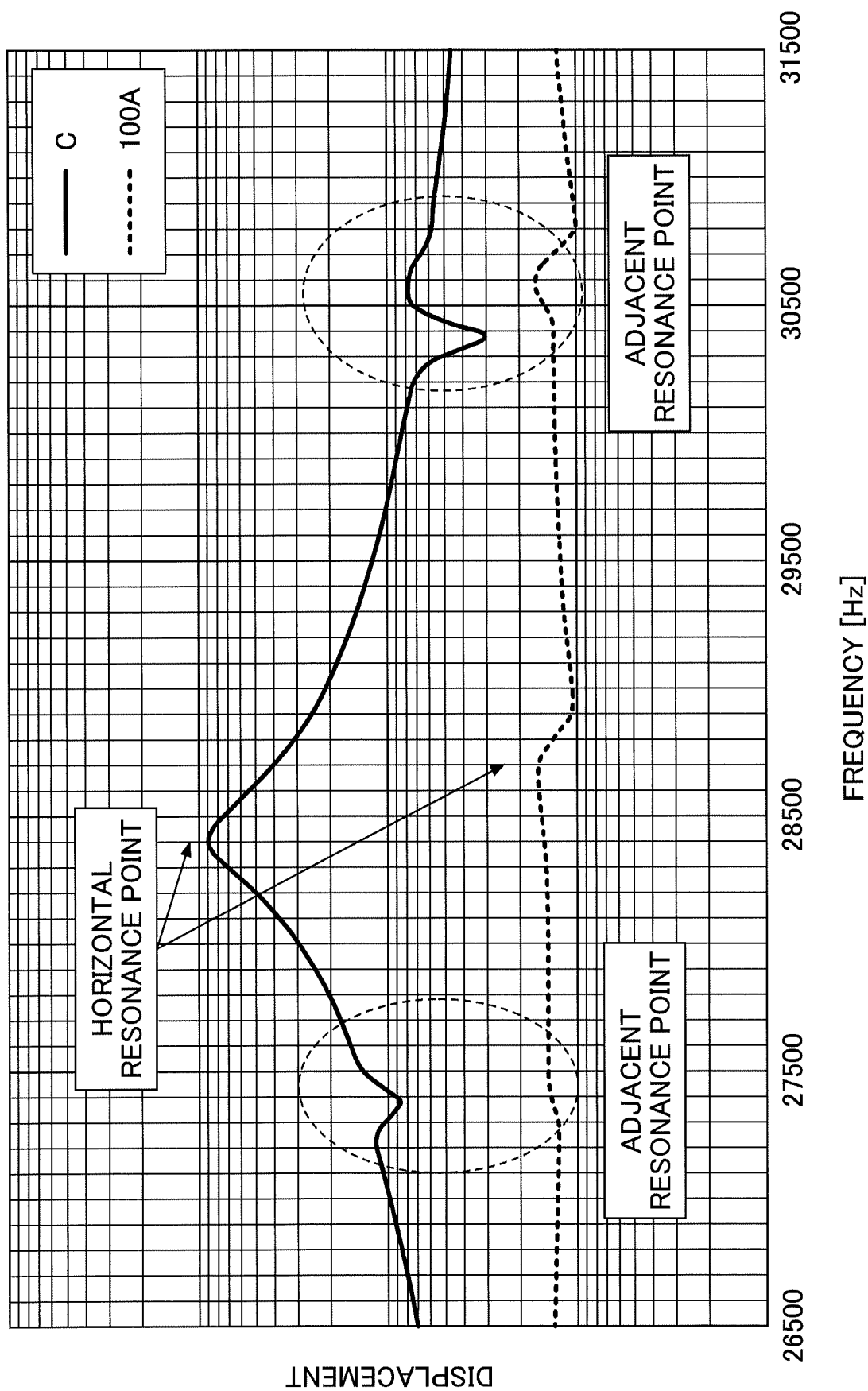
FIG. 8 is a diagram illustrating a displacement-frequency response of the optical scanning device according to the embodiment and a displacement-frequency response of the optical scanning device according to a first reference example.

FIG. 8 is a diagram illustrating a displacement-frequency response of the optical scanning device according to the present embodiment and a displacement-frequency response of the optical scanning device according to the first reference example. The optical scanning device according to the present embodiment is indicated by 100A, and the optical scanning device according to the first reference example is indicated by C.

As illustrated in FIG. 8, according to the optical scanning device according to the first reference example (C in FIG. 8), the displacement at the horizontal resonance point is large, and also at the adjacent resonance points, the displacement in characteristic change with respect to the frequency is large. According to the optical scanning device according to the present embodiment (100A in FIG. 8), the displacement at the horizontal resonance point is suppressed, and also at the adjacent resonance points, the displacement in characteristic change with respect to the frequency is suppressed to be small.

Figure 9:
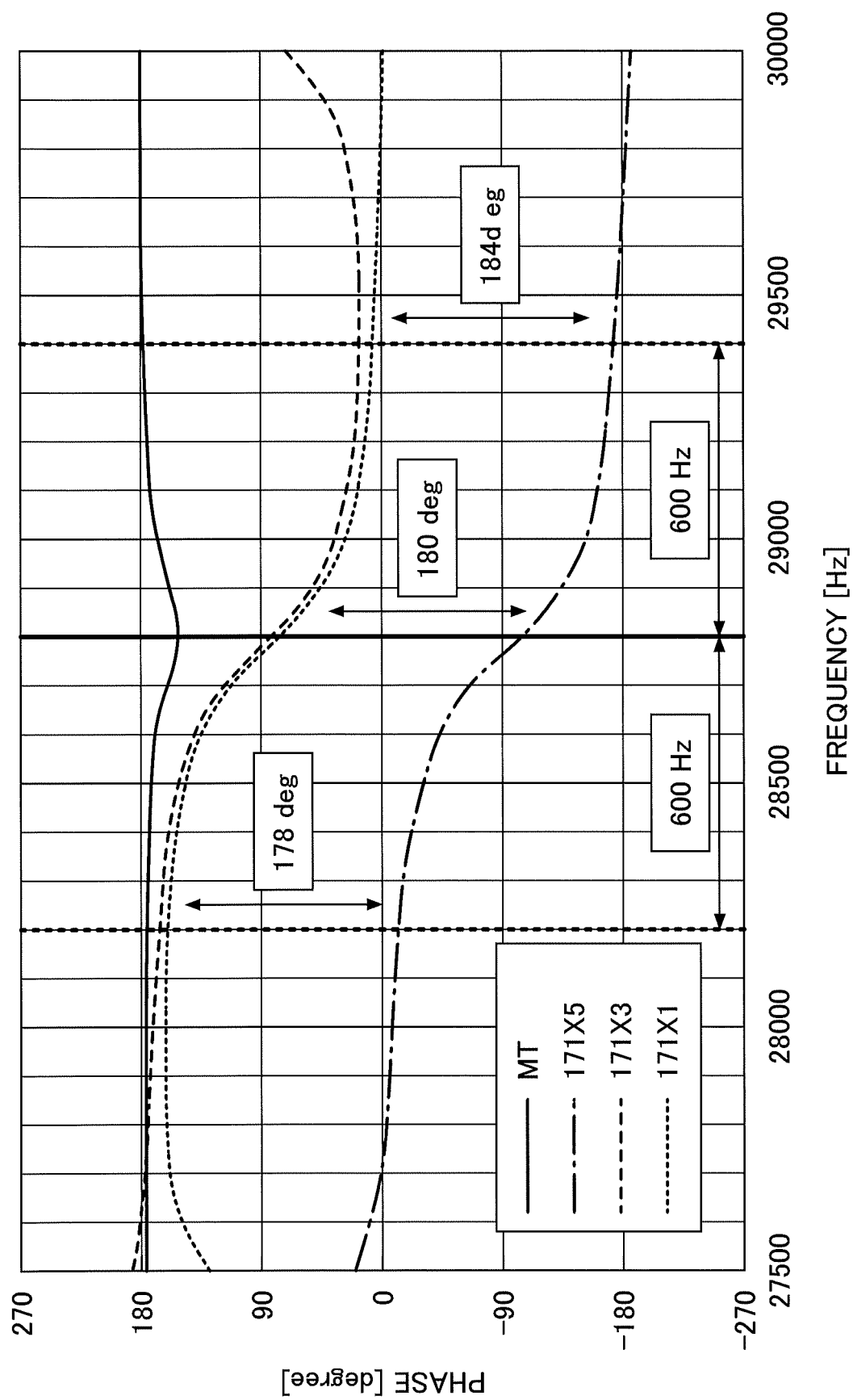
FIG. 9 is a diagram illustrating a phase-frequency response of each part of the optical scanning device according to the embodiment.

FIG. 9 is a diagram illustrating a phase-frequency response of each part of the optical scanning device according to the present embodiment. As illustrated in FIG. 4, with respect to the rib 174X5 of the turn portion 171X5 that is made heavy, the rib 174X3 of the turn portion 171X3 and the rib 174X1 of the turn portion 171X1 are lightweight. The phases of the turn portion 171X3 and the turn portion 171X1 are delayed from the turn portion 171X5 by approximately 180 degrees. As a result, a counter effect appears and oscillation of a mirror vertical end MT (see FIG. 3) is suppressed. Although the resonance frequency of the MEMS mirror changes by up to ±600 Hz due to a manufacturing variation and a temperature change, because the phase shift is almost 180 degrees, mechanical crosstalk does not occur even due to a manufacturing variation and a temperature change. Therefore, it is possible to suppress the displacement of the mirror reflection surface in the vertical direction at the horizontal resonance point and the adjacent resonance points at the time of horizontal drive. In this manner, it is possible to suppress the fluctuation in the vertical direction at the time of horizontal resonance drive.

Figure 10:
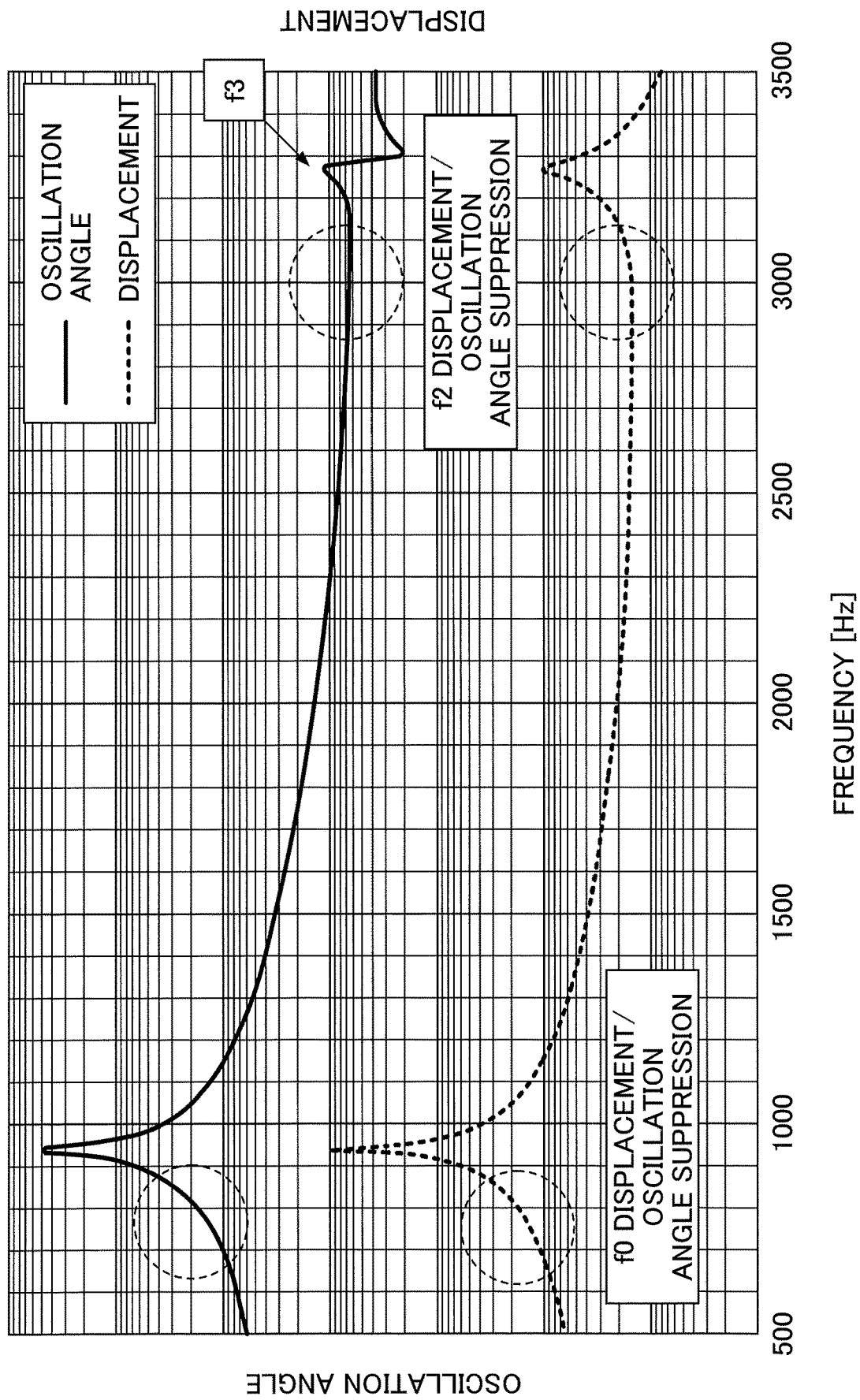
FIG. 10 is a diagram illustrating a frequency response with respect to an oscillation angle and a displacement of the optical scanning device according to the embodiment.

FIG. 10 is a diagram illustrating a frequency response with respect to an oscillation angle and a displacement of the optical scanning device according to the present embodiment. In the vicinity of 700 Hz to 800 Hz, the displacement of f0 and the fluctuation of the oscillation angle are suppressed. Also, in the vicinity of 3000 Hz, the displacement of f2 and the fluctuation of the oscillation angle are suppressed.

Figure 11:
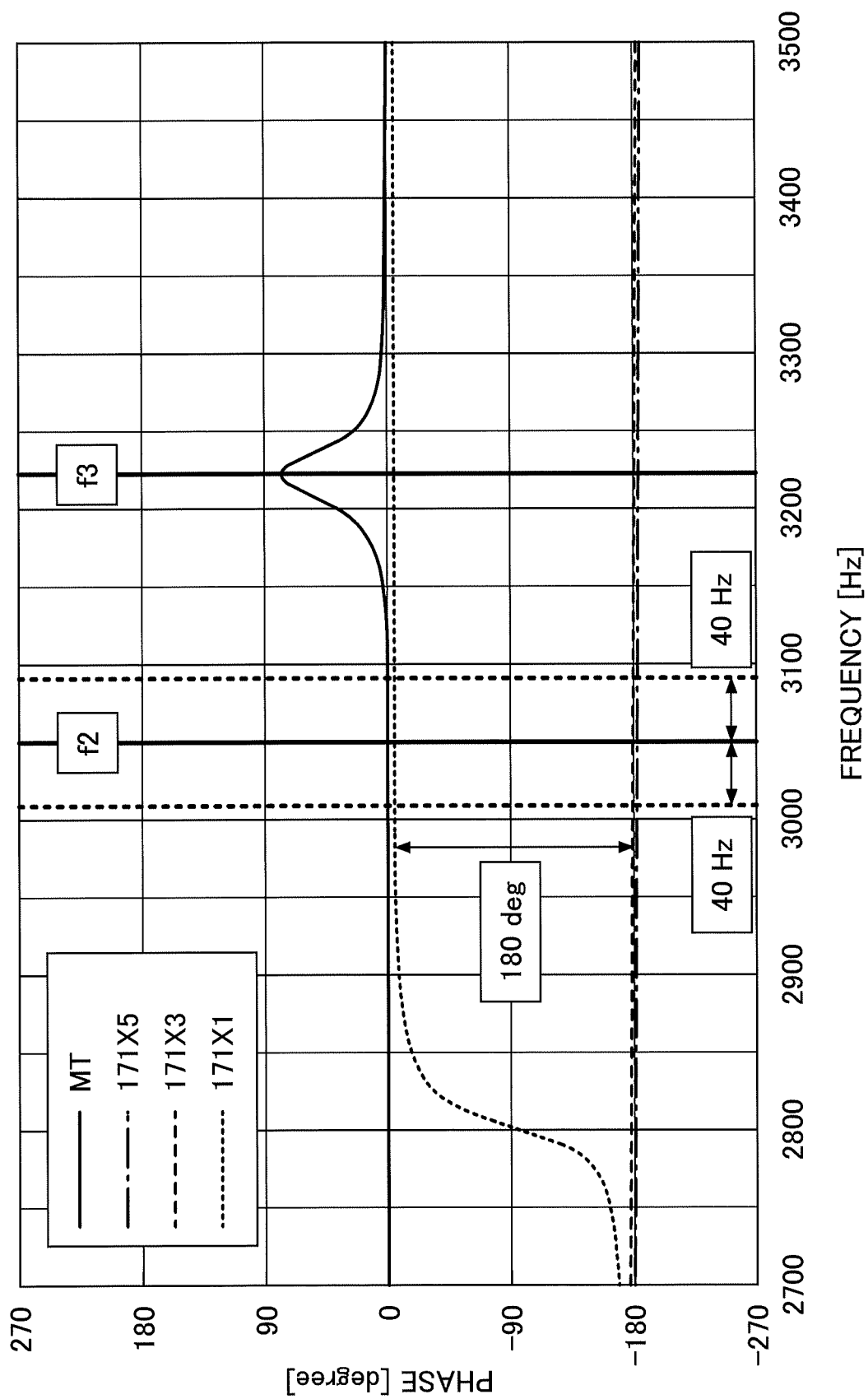
FIG. 11 is a diagram illustrating a phase-frequency response of each part of the optical scanning device according to the embodiment.

FIG. 11 is a diagram illustrating a phase-frequency response of each part of the optical scanning device according to the present embodiment. With respect to the rib 174X5 of the turn portion 171X5 that is made heavy, the rib 174X3 of the turn portion 171X3 and the rib 174X1 of the turn portion 171X1 are lightweight. The phases of the turn portion 171X3 and the turn portion 171X1 are delayed from the turn portion 171X5 by approximately 180 degrees. Thereby, a counter effect appears and oscillation of the mirror vertical end MT at f2 is suppressed. Although f2 of a MEMS mirror varies by approximately ±40 Hz at the maximum due to a manufacturing variation and a temperature change, because the phase shift is almost 180 degrees, f2 oscillation can be suppressed ringing does not occur even due to a manufacturing variation and a temperature change. Therefore, it is possible to suppress the displacement/oscillation at f0 and f2 of the mirror reflection surface, and it is possible to suppress ringing.

By adding ribs, on the back surfaces of deformation portions of the vertical drive beams in the direction substantially orthogonal to the longitudinal direction of the vertical drive beams (direction of vertical rotation axis V), it is possible to prevent occurrence of mechanical crosstalk while suppressing ringing oscillation caused by f0 and f2. Also, even when a resonance frequency variation due to a manufacturing variation or a resonance frequency change due to a temperature change occurs, occurrence of mechanical crosstalk can be prevented while suppressing ringing oscillation.

MODIFIED EXAMPLES

Figure 12:
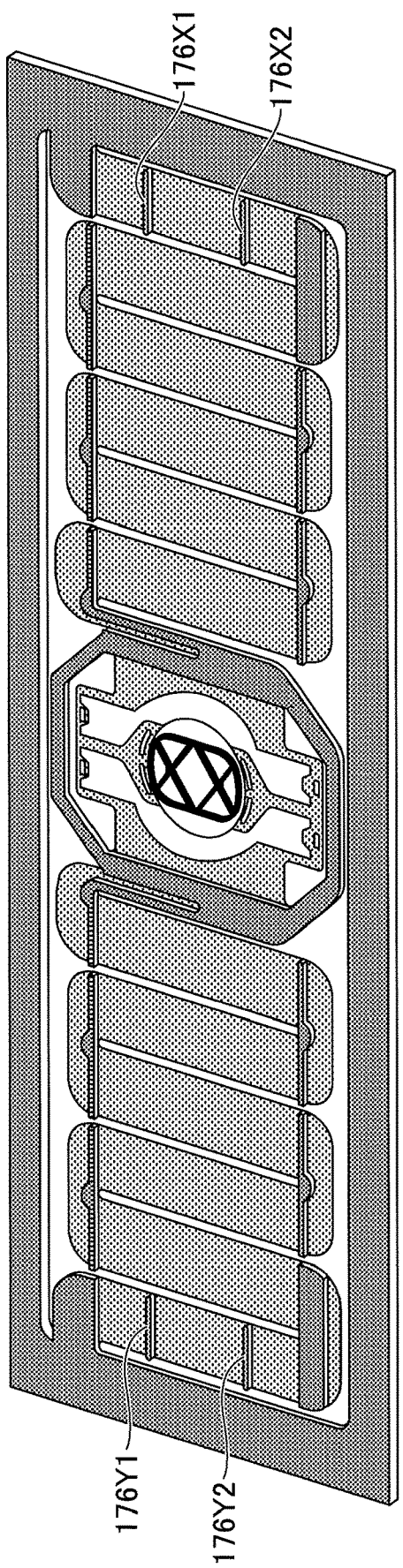
FIG. 12 is a perspective view of an optical scanning device according to a first modified example.
Figure 13:
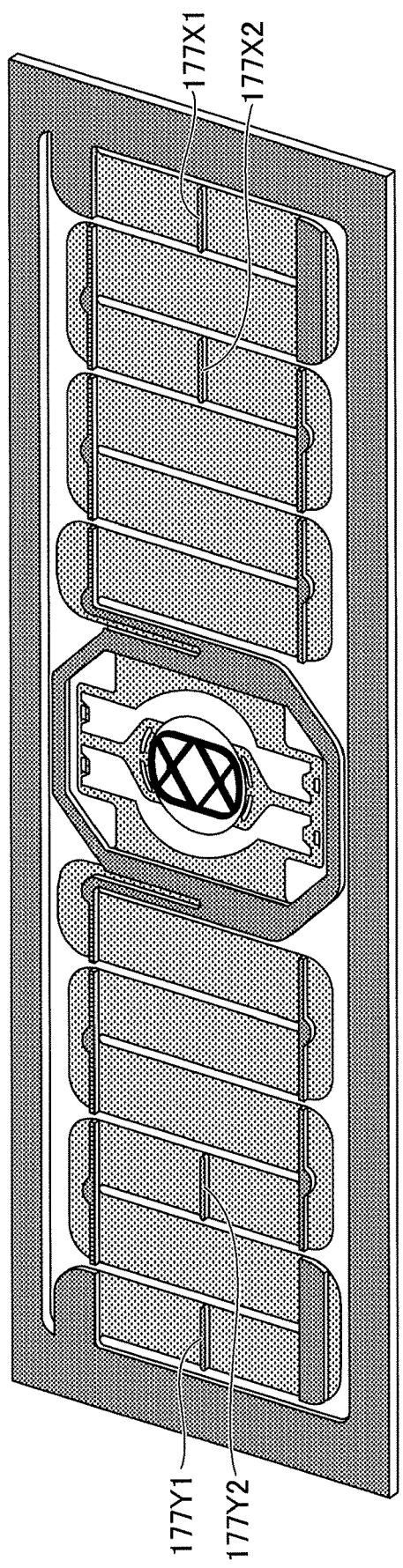
FIG. 13 is a perspective view of an optical scanning device according to a second modified example.
Figure 14:
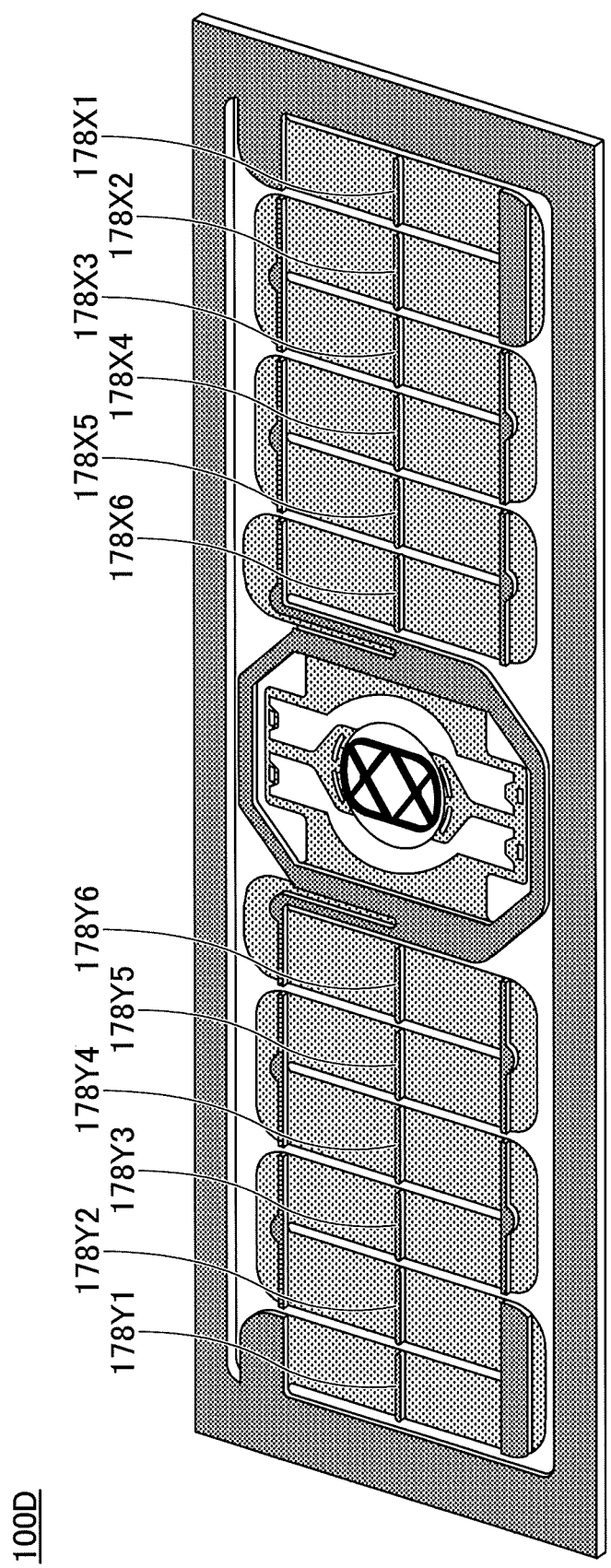
FIG. 14 is a perspective view of an optical scanning device according to a third modified example.

FIG. 12 is a perspective view of an optical scanning device according to a first modified example. FIG. 13 is a perspective view of an optical scanning device according to a second modified example. FIG. 14 is a perspective view of an optical scanning device according to a third modified example. In the first modified example illustrated in FIG. 12, on each of the vertical beams that are the outermost beams of vertical drive beams of an optical scanning unit 100B and that are close to the fixed frame, two ribs are formed. That is, four ribs, in total, that are 176X1, 176X2, 176Y1, and 176Y2 are formed. In the second modified example illustrated in FIG. 13, on each of the vertical beams that are the outermost beams of vertical drive beams of an optical scanning unit 100C and that are close to the fixed frame and on each of the third vertical beams from the outermost beams, one rib is formed. That is, four ribs, in total, that are 177X1, 177X2, 177Y1, and 177Y2 are formed. In the third modified example illustrated in FIG. 14, on each of the vertical beams of the vertical drive beams of an optical scanning unit 100D, six ribs are formed. That is, twelve ribs, in total, that are 178X1, 178X2, 178X3, 178X4, 178X5, 178X6, 178Y1, 178Y2, 178Y3, 178Y4, 178Y5, and 178Y6 are formed.

Although rib are formed on the outermost vertical beams of the vertical drive beams, a substantially similar effect can be obtained even when one or more ribs are attached to the back surface of the other vertical beams. However, in consideration of preventing a decrease in f0, it is preferable to arrange a single rib for each of the left and right positions that are on the outermost beams, which constitute the vertical drive beams, and that are close to the fixed frame. Even when forming ribs on the outermost vertical beams of the vertical drive beams, it is preferable that the ribs are closer to the fixed frame connection portions A12 and A14. However, if ribs are provided on the back surface of the piezoelectric sensors 195 and 196, the existence of the ribs may affect the oscillation angle measurement of the piezoelectric sensors. Therefore, it is preferable to avoid a position corresponding to the back surface of the piezoelectric sensors 195 and 196.

Figure 15A:
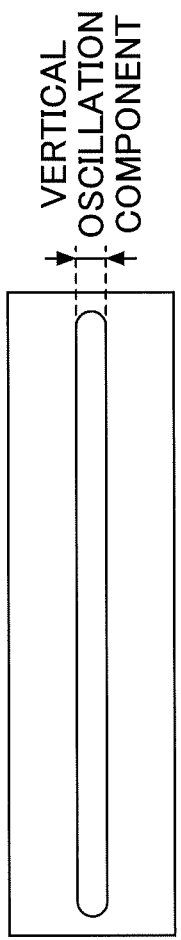
Figure 15B:
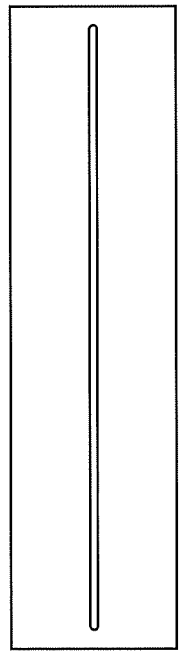

FIGS. 15A and 15B are diagrams schematically illustrating photographs of a laser irradiation surface when laser is scanned by resonantly driving with a single horizontal axis in a resonant/non-resonant biaxial drive MEMS mirror. FIG. 15A illustrates a case where mechanical crosstalk does not occur, and FIG. 15B illustrates a case where mechanical crosstalk occurs. In FIGS. 15A and 15B, the boundary between the irradiated portion and the non-irradiated portion of the laser light is indicated by the solid line. In a case where mechanical crosstalk is not present, as illustrated in FIG. 15A, an image of a laser light irradiation portion extending only in the horizontal direction is obtained only having a spreading of a spot diameter of the laser light in the vertical direction. In a case where mechanical crosstalk is present, as illustrated in FIG. 15B, an image of the laser light irradiation part having a spread of a vertical oscillation component in the vertical direction is obtained.

Even when mechanical crosstalk as illustrated in FIG. 15B occurs, as in the optical scanning device according to the present embodiment, it is possible to suppress the mechanical crosstalk by adding ribs, on the back surfaces of deformation portions of the vertical drive beams in the direction substantially orthogonal to the longitudinal direction of the vertical drive beams (direction of vertical rotation axis V).

SECOND REFERENCE EXAMPLE

Figure 16:
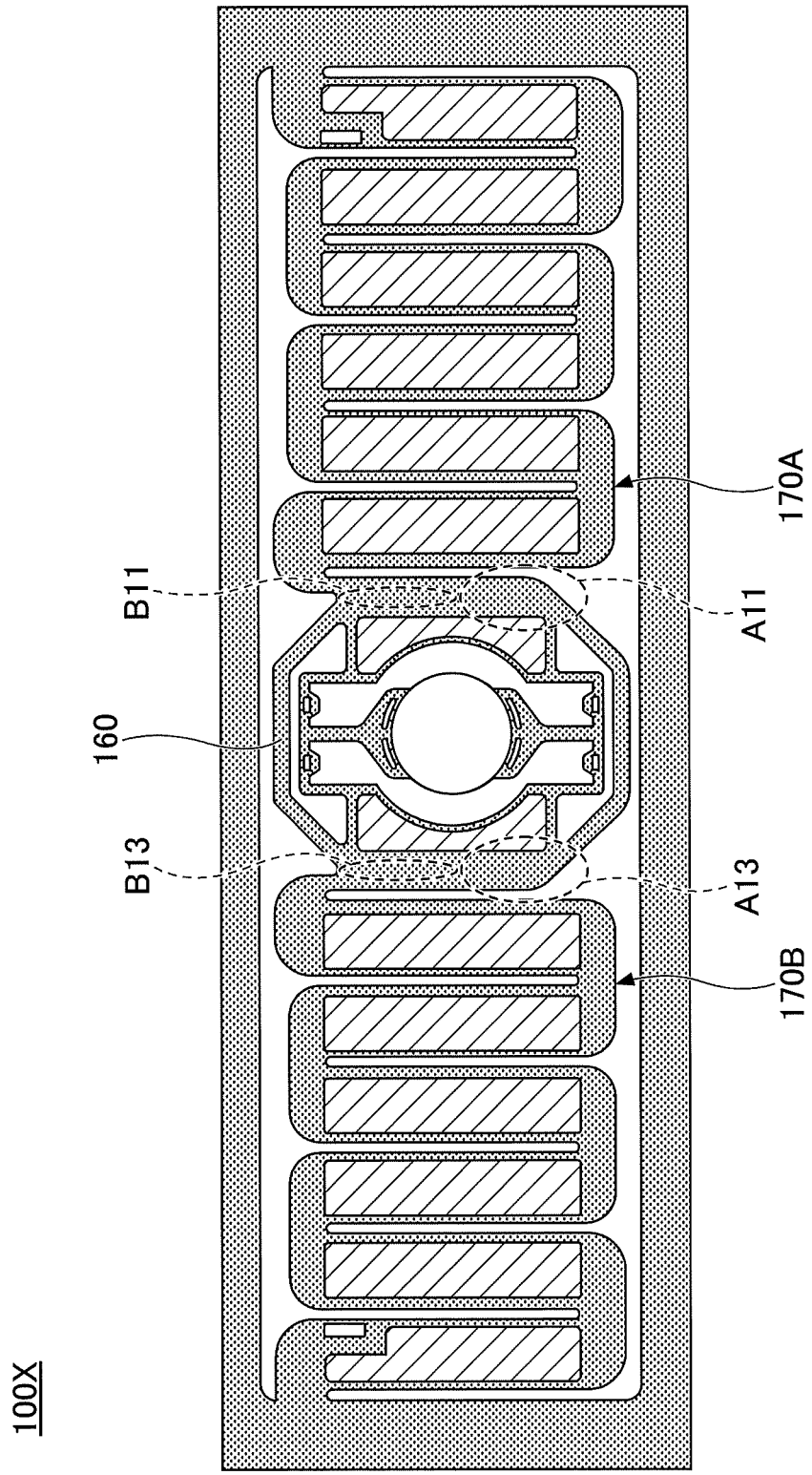
FIG. 16 is an upper surface side plan view illustrating an optical scanning unit of an optical scanning device according to a second reference example.
Figure 17:
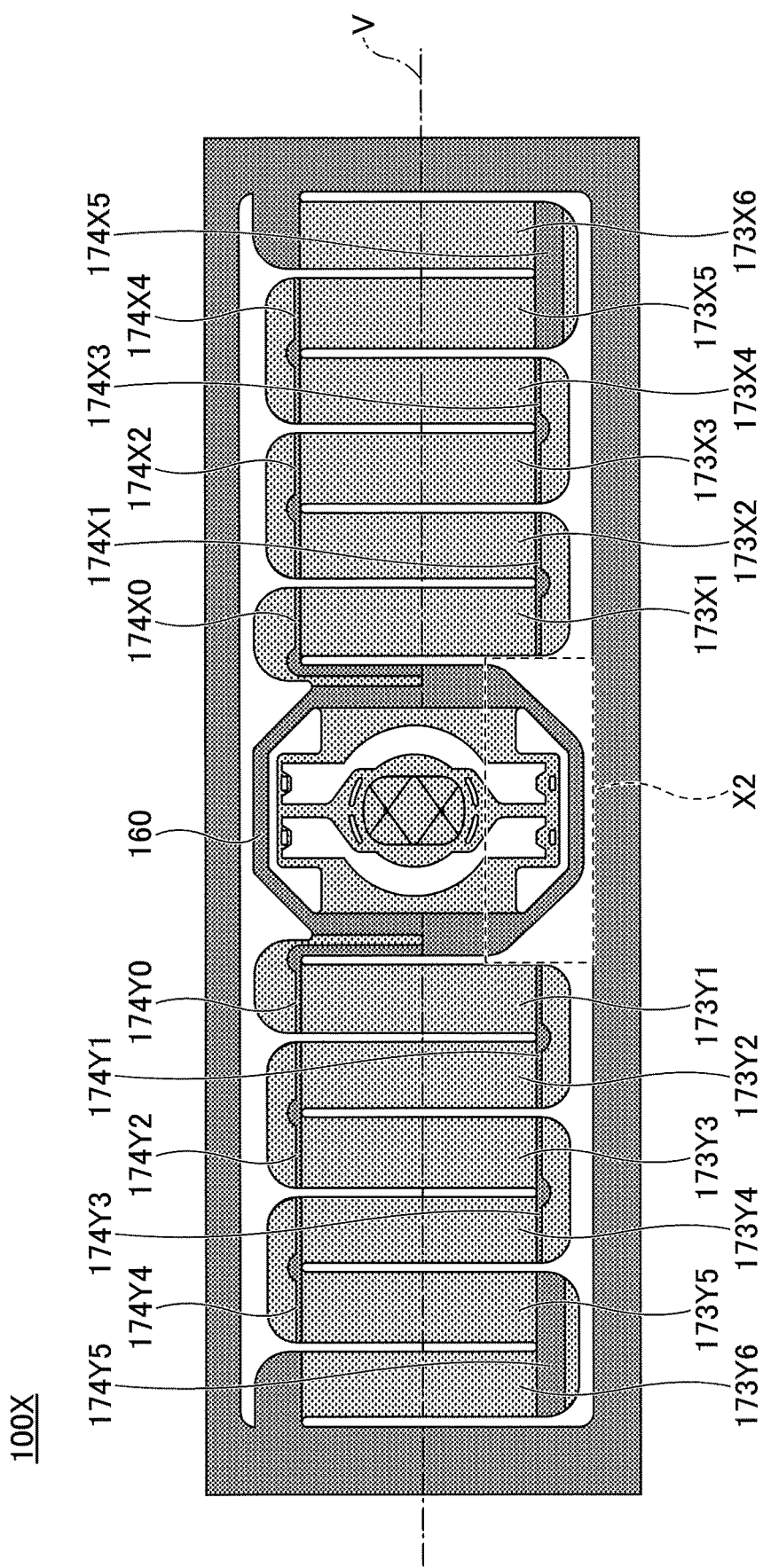
FIG. 17 is a lower surface side plan view illustrating the optical scanning unit of the optical scanning device according to the second reference example.

FIG. 16 is an upper surface side plan view illustrating an optical scanning unit of an optical scanning device according to a second reference example. FIG. 17 is a lower surface side plan view illustrating the optical scanning unit of the optical scanning device according to the second reference example. The second reference example differs from the above described optical scanning device according to the present embodiment in the following two points, and others of the second reference example are similar to the optical scanning device according to the present embodiment. (1) In the movable frame 160, with respect to the vertical rotation axis V, the opposite side of one side is not heavier than the one side (the area X2 side is not formed to be heavier), and the center of gravity of the mirror 110 and the mirror support 120 is not located on the vertical rotation axis V. (2) On the back surfaces of the vertical drive beams 170A and 170B, the ribs 175X and 175Y are not formed at positions away from the connection positions of the vertical beams and the turn portions toward the vertical rotation axis V. On the other hand, the second reference example is similar to the embodiment in that the connection position of the vertical beams 173X5 and 173X6 and the turn portion 171X5 and the connection position of the vertical beams 173Y5 and 173Y6 and the turn portion 171Y5 are made heavier as compared with the other connection positions.

Changing the mass of adjacent turn portions of the vertical drive beams to optimize the mass, it is possible to obtain an effect of suppressing fluctuation in the vertical direction during horizontal resonance drive. Although a similar effect can be obtained by weighting the innermost turn portion, this decreases f0 and causes a decrease in a linear drive portion of a drive waveform and a decrease in resolution. By making the outermost turn portions heavy and making the other portions light-weight, the decrease of f0 does not occur.

Figure 18:
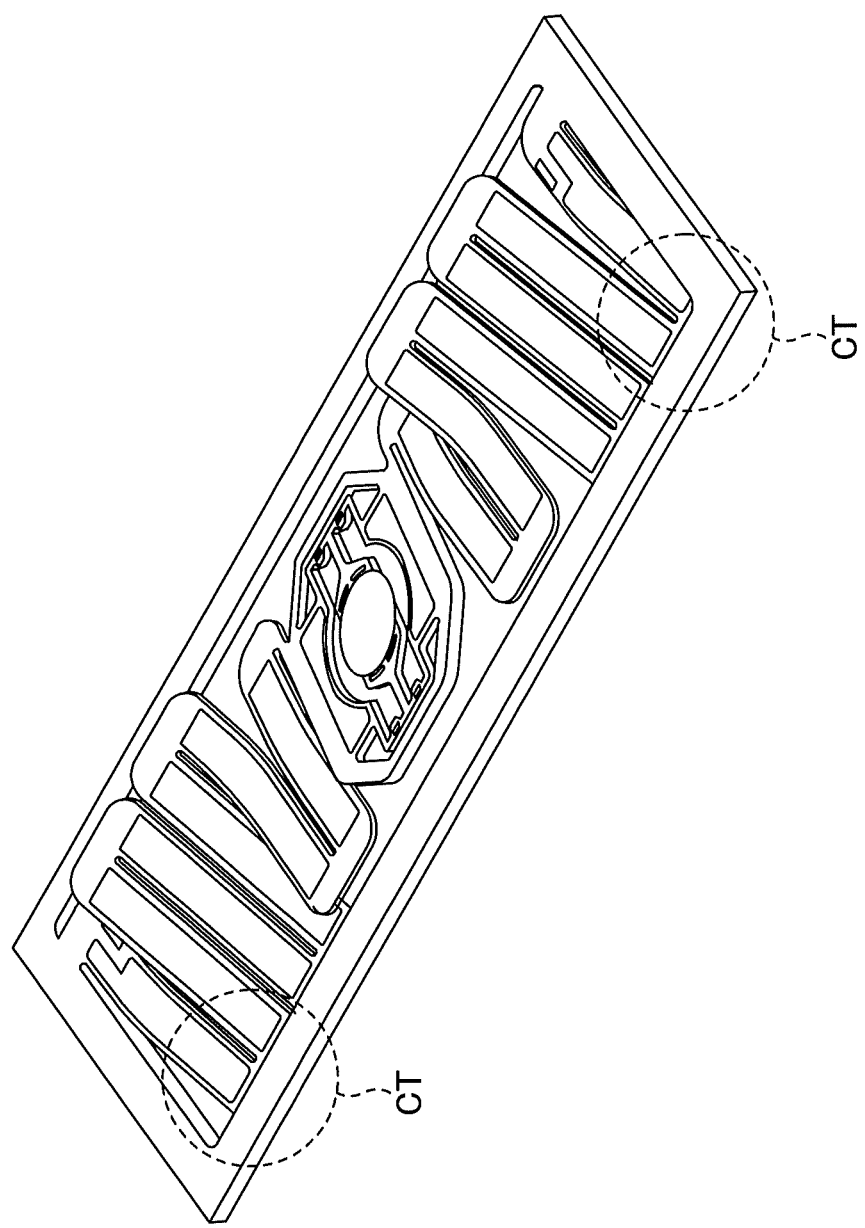
FIG. 18 is a diagram that describes a counter effect by weighted turn portions.

FIG. 18 is a diagram that describes a counter effect by weighted turn portions. When the vertical drive beams oscillate resonantly, in the portions indicated by the broken line circles CT in FIG. 18, a phase delay occurs in the weighted turn portions, and a counter effect of suppressing oscillation of the other beams occurs.

Figure 19:
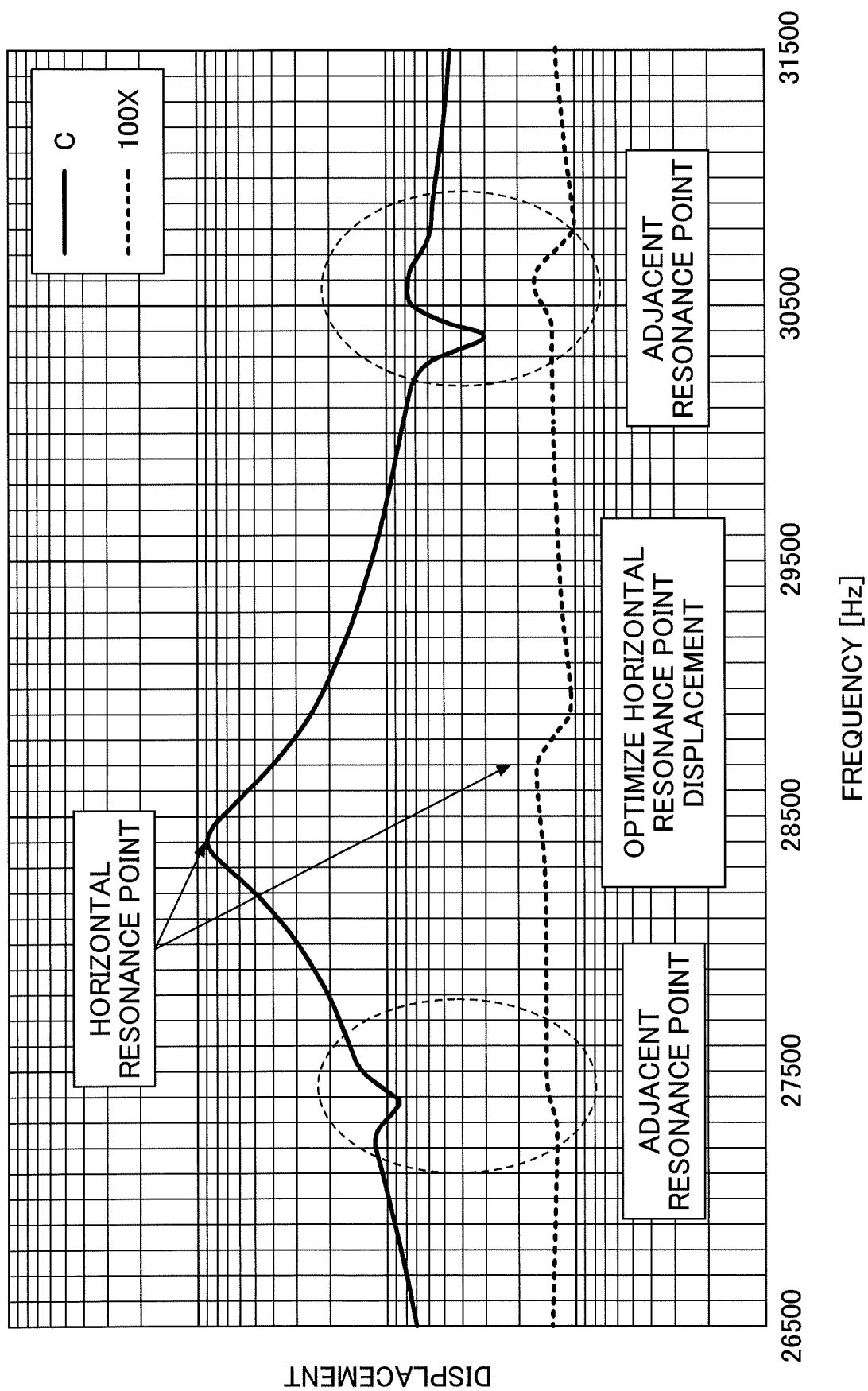
FIG. 19 is a diagram illustrating a displacement-frequency response of the optical scanning device according to the second reference example and a displacement-frequency response of the optical scanning device according to the first reference example.

FIG. 19 is a diagram illustrating a displacement-frequency response of the optical scanning device according to the second reference example and a displacement-frequency response of the optical scanning device according to the first reference example. The optical scanning device according to the second reference example is indicated by 100X, and the optical scanning device according to the first reference example is indicated by C.

As illustrated in FIG. 19, according to the optical scanning device according to the first reference example (C in FIG. 19), the displacement at the horizontal resonance point is large, and also at the adjacent resonance points, the displacement in characteristic change with respect to the frequency is large. According to the optical scanning device according to the second reference example (100X in FIG. 19), the displacement at the horizontal resonance point is suppressed, and also at the adjacent resonance points, the displacement in characteristic change with respect to the frequency is suppressed to be small.

Figure 20:
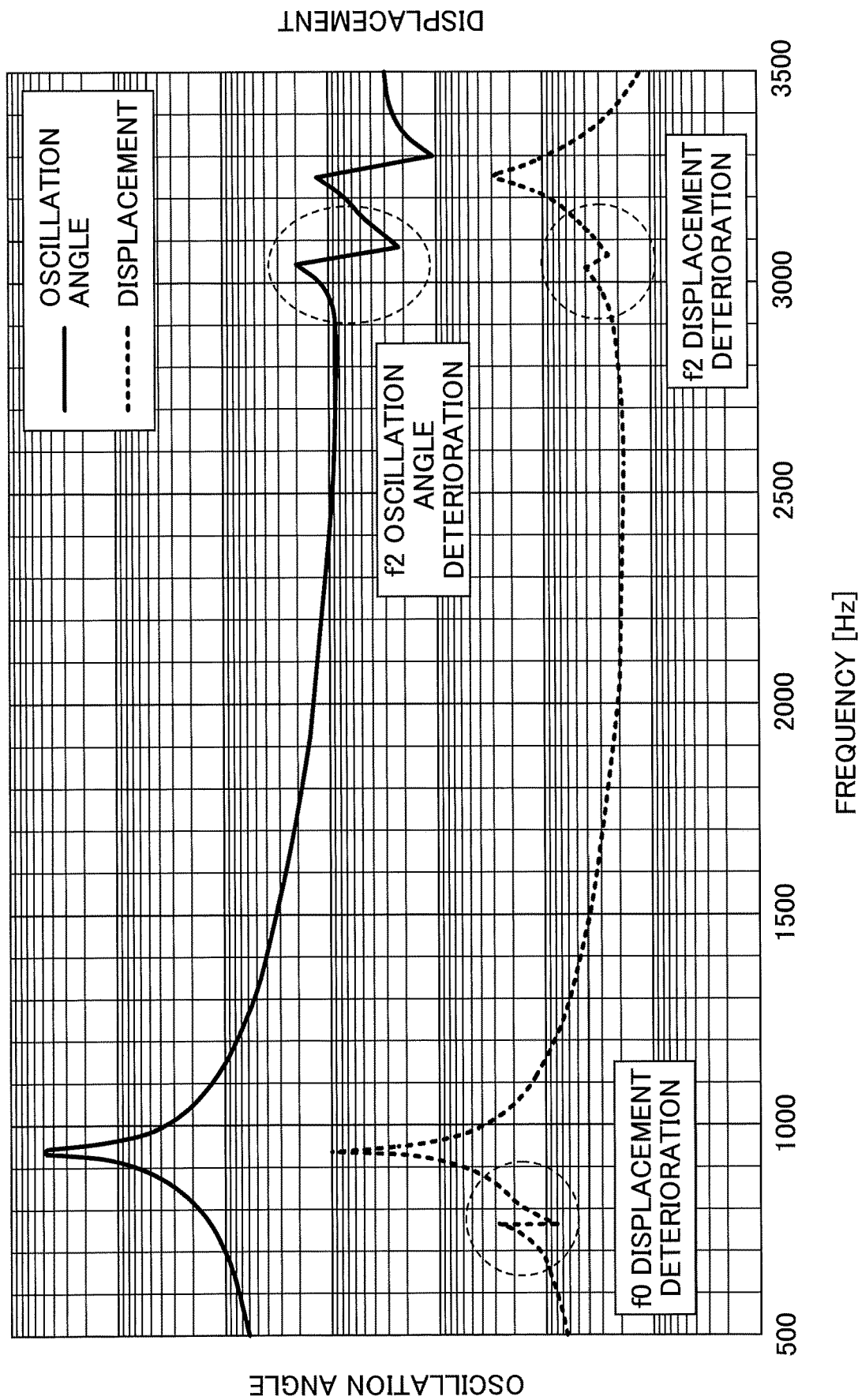
FIG. 20 is a diagram illustrating a frequency response with respect to an oscillation angle and a displacement of the optical scanning device according to the second reference example.

FIG. 20 is a diagram illustrating a frequency response with respect to an oscillation angle and a displacement of the optical scanning device according to the second reference example. In the vicinity of 700 Hz to 800 Hz, the displacement of f0 is deteriorated. Also, in the vicinity of 3000 Hz, the displacement of f2 and the oscillation angle are deteriorated. As described above, due to the counter effect of oscillation of the vertical drive beams, when suppressing the displacement in the vertical direction at the horizontal resonance point and the adjacent resonance points at the time of horizontal drive, the displacement/oscillation angle of f0 and f2 changes. It is impossible to achieve both prevention of fluctuation in the vertical direction during horizontal drive and suppression of the f2 oscillation angle, which is an original purpose.

THIRD REFERENCE EXAMPLE

Figure 21:
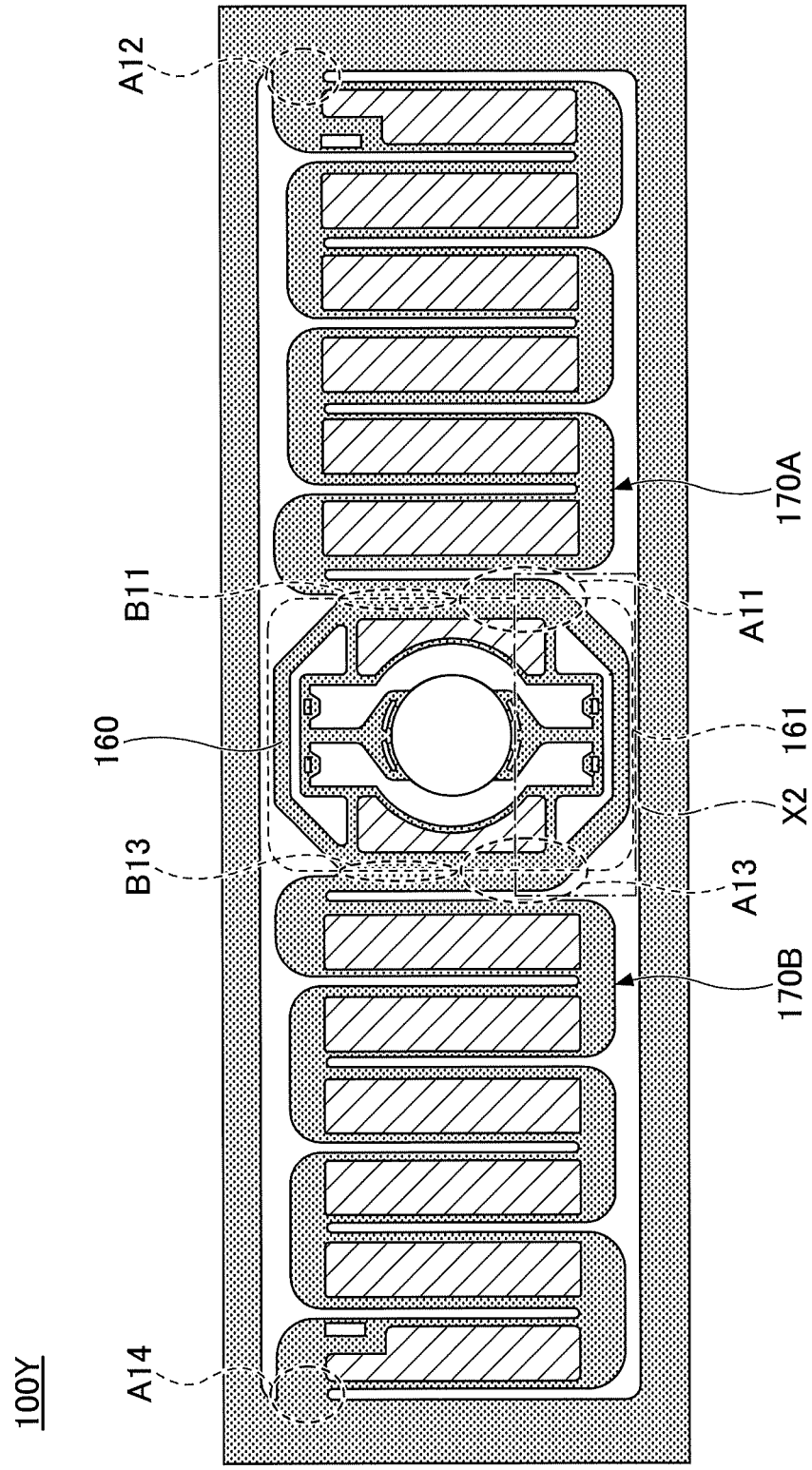
FIG. 21 is an upper surface side plan view illustrating an optical scanning unit of an optical scanning device according to a third reference example.
Figure 22:
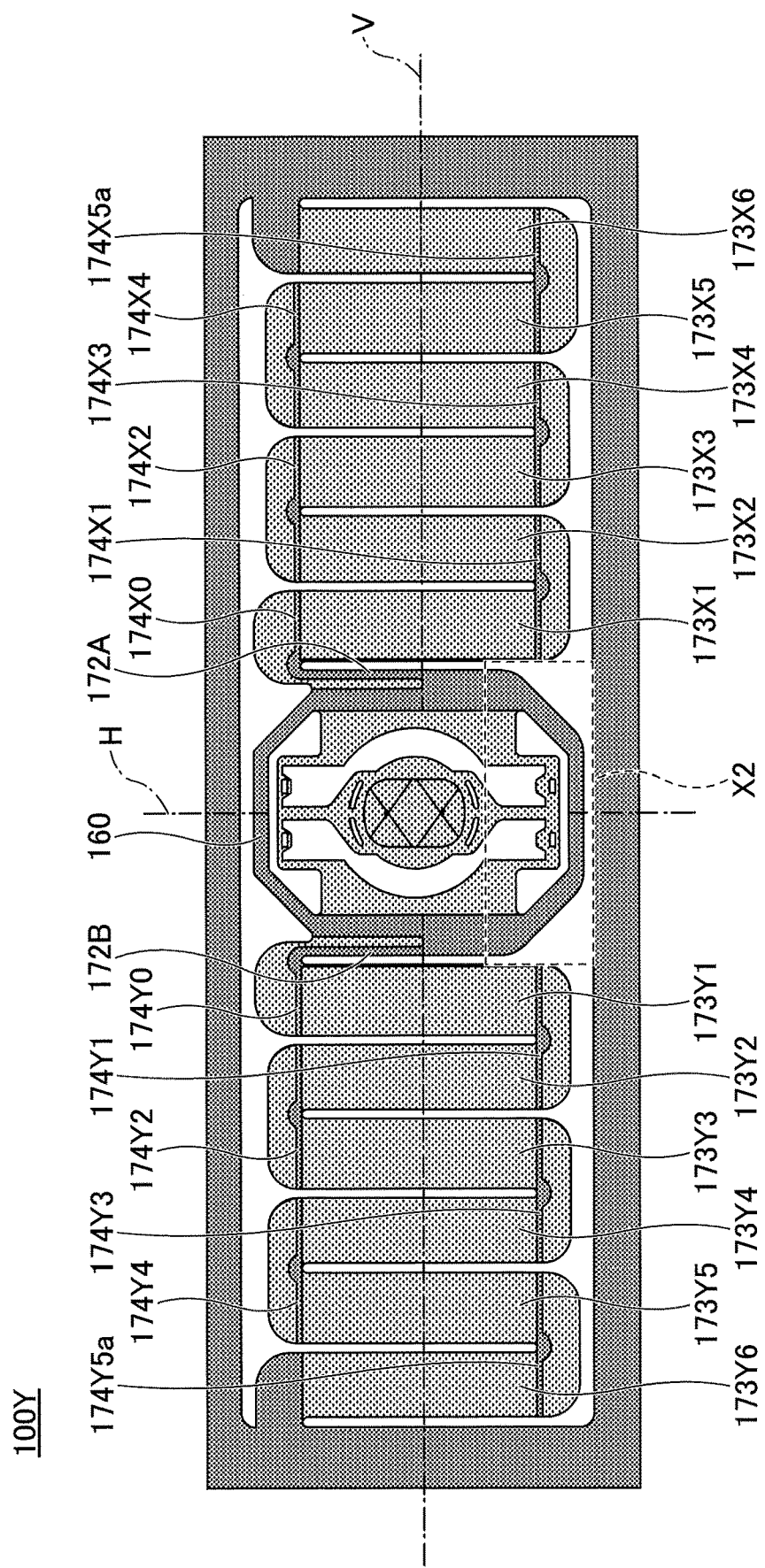
FIG. 22 is a lower surface side plan view illustrating the optical scanning unit of the optical scanning device according to the third reference example.

FIG. 21 is an upper surface side plan view illustrating an optical scanning unit of an optical scanning device according to a third reference example. FIG. 22 is a lower surface side plan view illustrating the optical scanning unit of the optical scanning device according to the third reference example. The third reference example differs from the above described optical scanning device according to the present embodiment in the following two points, and others of the third reference example are similar to the optical scanning device according to the present embodiment. (1) The connection position of the vertical beams 173X5 and 173X6 and the turn portion 171X5 and the connection position of the vertical beams 173Y5 and 173Y6 and the turn portion 171Y5 are not made heavier as compared with the other connection positions. (2) On the back surfaces of the vertical drive beams 170A and 170B, the ribs 175X and 175Y are not formed at positions away from the connection positions of the vertical beams and the turn portions toward the vertical rotation axis V. On the other hand, the third reference example is similar to the embodiment in that the movable frame 160 is formed such that, with respect to the vertical rotation axis V, the opposite side of one side is heavier than the one side (the area X2 side is formed to be heavier), and the center of gravity of the mirror 110 and the mirror support 120 is located on the vertical rotation axis V.

Figure 23:
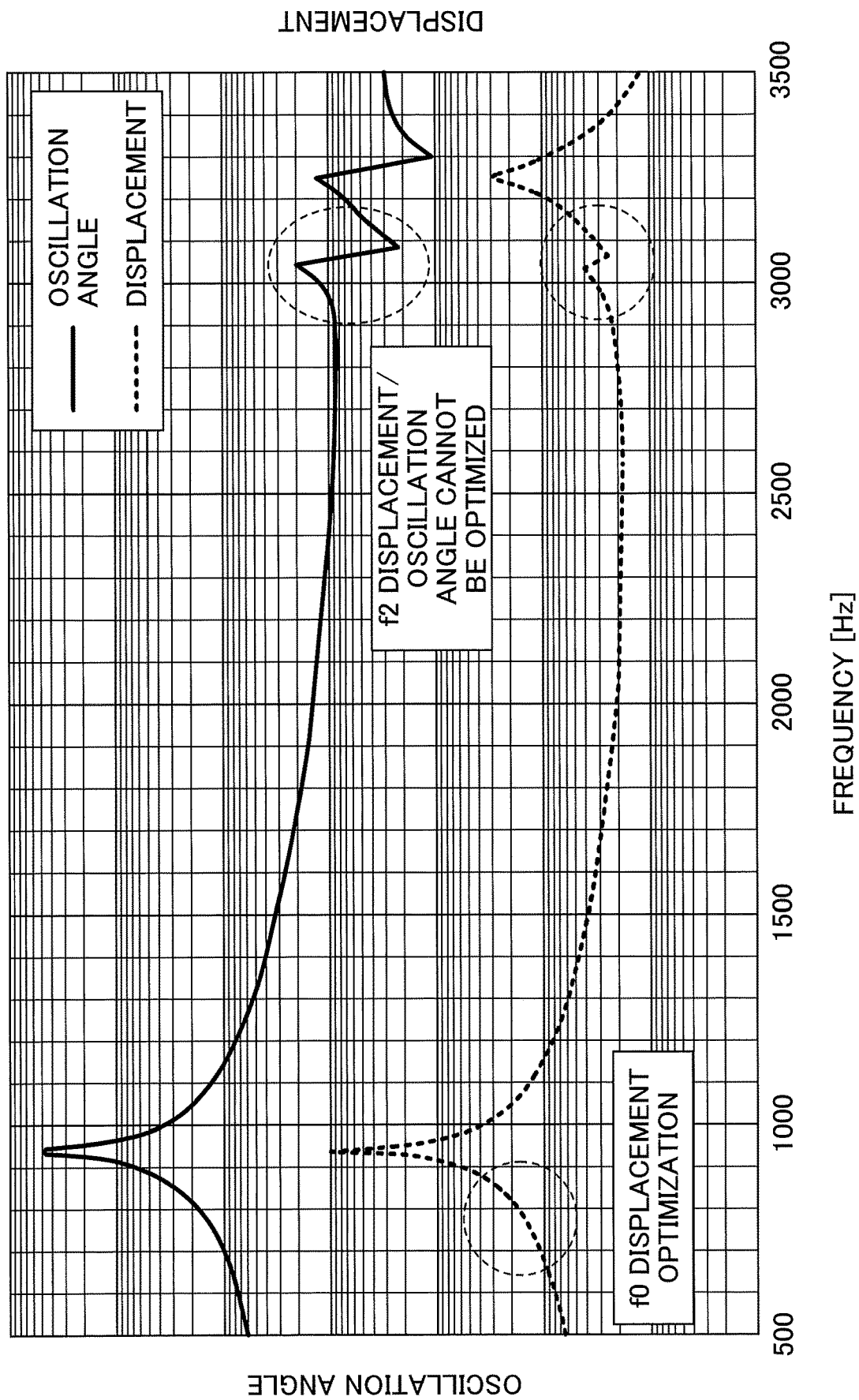
FIG. 23 is a diagram illustrating a frequency response with respect to an oscillation angle and a displacement of the optical scanning device according to the third reference example.

FIG. 23 is a diagram illustrating a frequency response with respect to an oscillation angle and a displacement of the optical scanning device according to the third reference example. In the vicinity of 700 Hz to 800 Hz, the displacement of f0 is suppressed. On the other hand, in the vicinity of 3000 Hz, the displacement of f2 and the oscillation angle are deteriorated. As described above, although the displacement/oscillation angle of f0 can be optimized by adjusting the weight of the movable frame, the displacement/oscillation angle of f2 cannot be optimized.

FOURTH REFERENCE EXAMPLE

Figure 24:
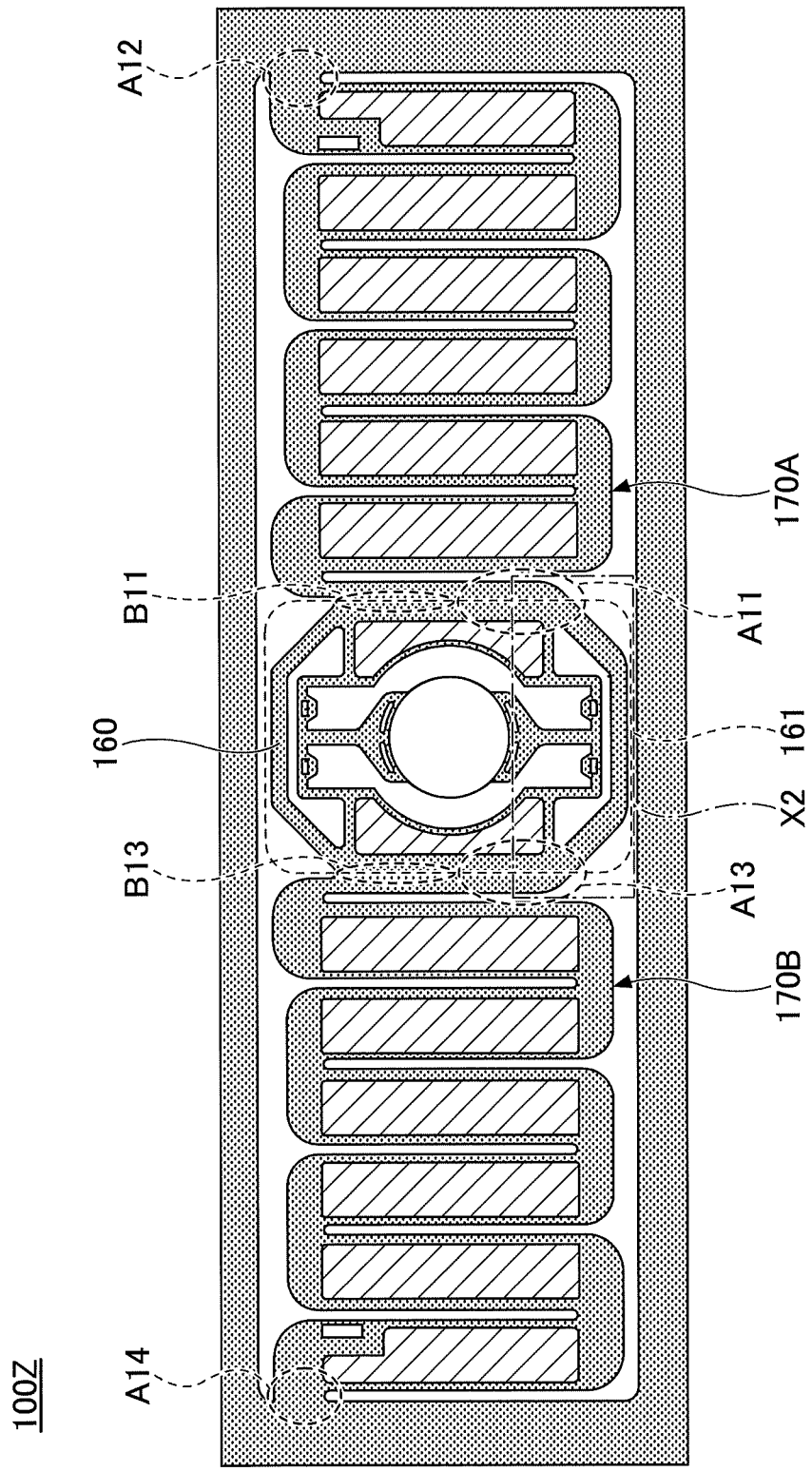
FIG. 24 is an upper surface side plan view illustrating an optical scanning unit of an optical scanning device according to a fourth reference example.
Figure 25:
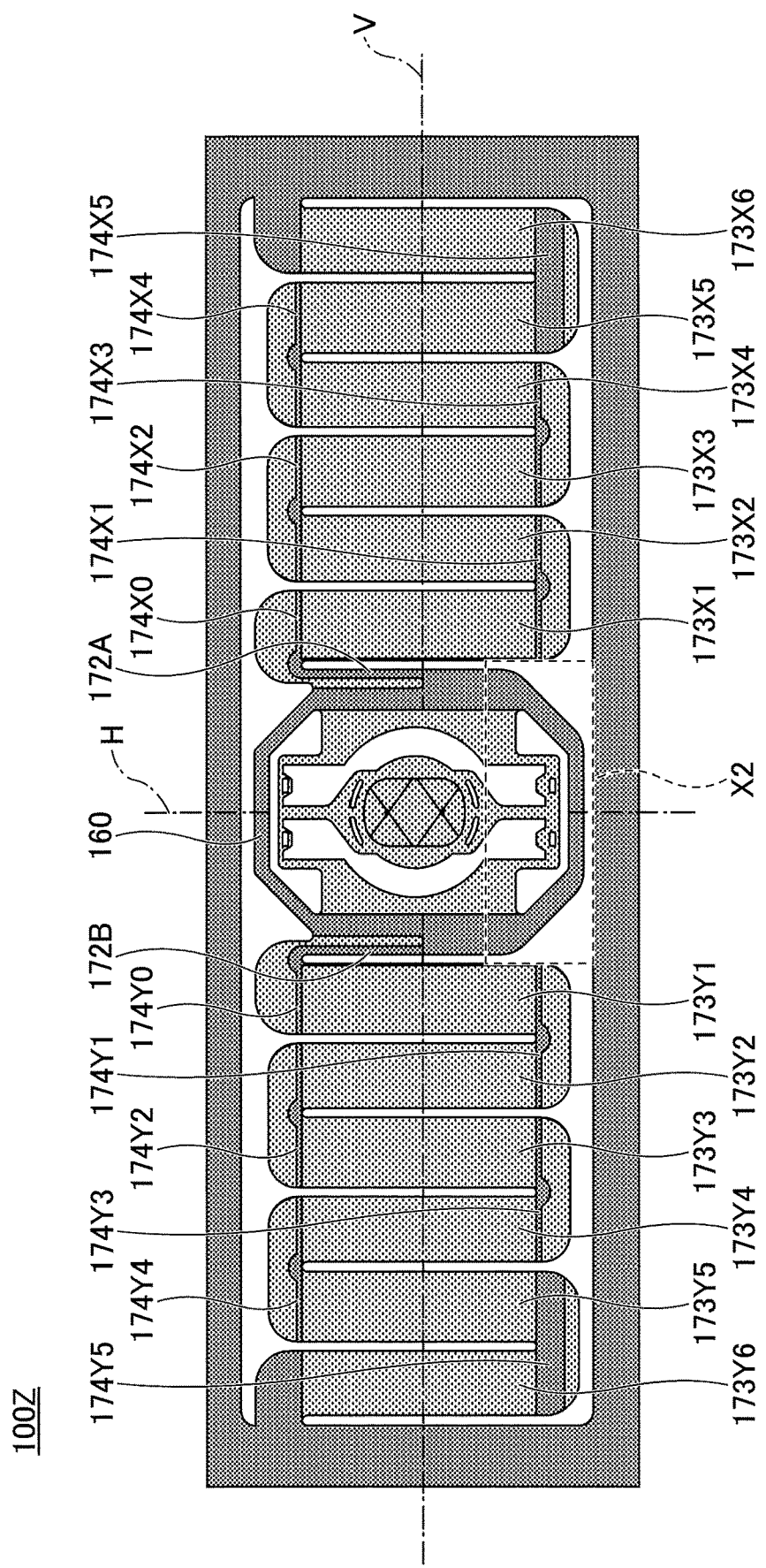
FIG. 25 is a lower surface side plan view illustrating the optical scanning unit of the optical scanning device according to the fourth reference example.

FIG. 24 is an upper surface side plan view illustrating an optical scanning unit of an optical scanning device according to a fourth reference example. FIG. 25 is a lower surface side plan view illustrating the optical scanning unit of the optical scanning device according to the fourth reference example. The fourth reference example differs from the above described optical scanning device according to the present embodiment in the following point, and others of the fourth reference example are similar to the optical scanning device according to the present embodiment. (1) On the back surfaces of the vertical drive beams 170A and 170B, the ribs 175X and 175Y are not formed at positions away from the connection positions of the vertical beams and the turn portions toward the vertical rotation axis V. On the other hand, the fourth reference example is similar to the embodiment in that the connection position of the vertical beams 173X5 and 173X6 and the turn portion 171X5 and the connection position of the vertical beams 173Y5 and 173Y6 and the turn portion 171Y5 are made heavier as compared with the other connection positions, and in that the movable frame 160 is formed such that, with respect to the vertical rotation axis V, the opposite side of one side is heavier than the one side (the area X2 side is formed to be heavier), and the center of gravity of the mirror 110 and the mirror support 120 is located on the vertical rotation axis V.

Figure 26:
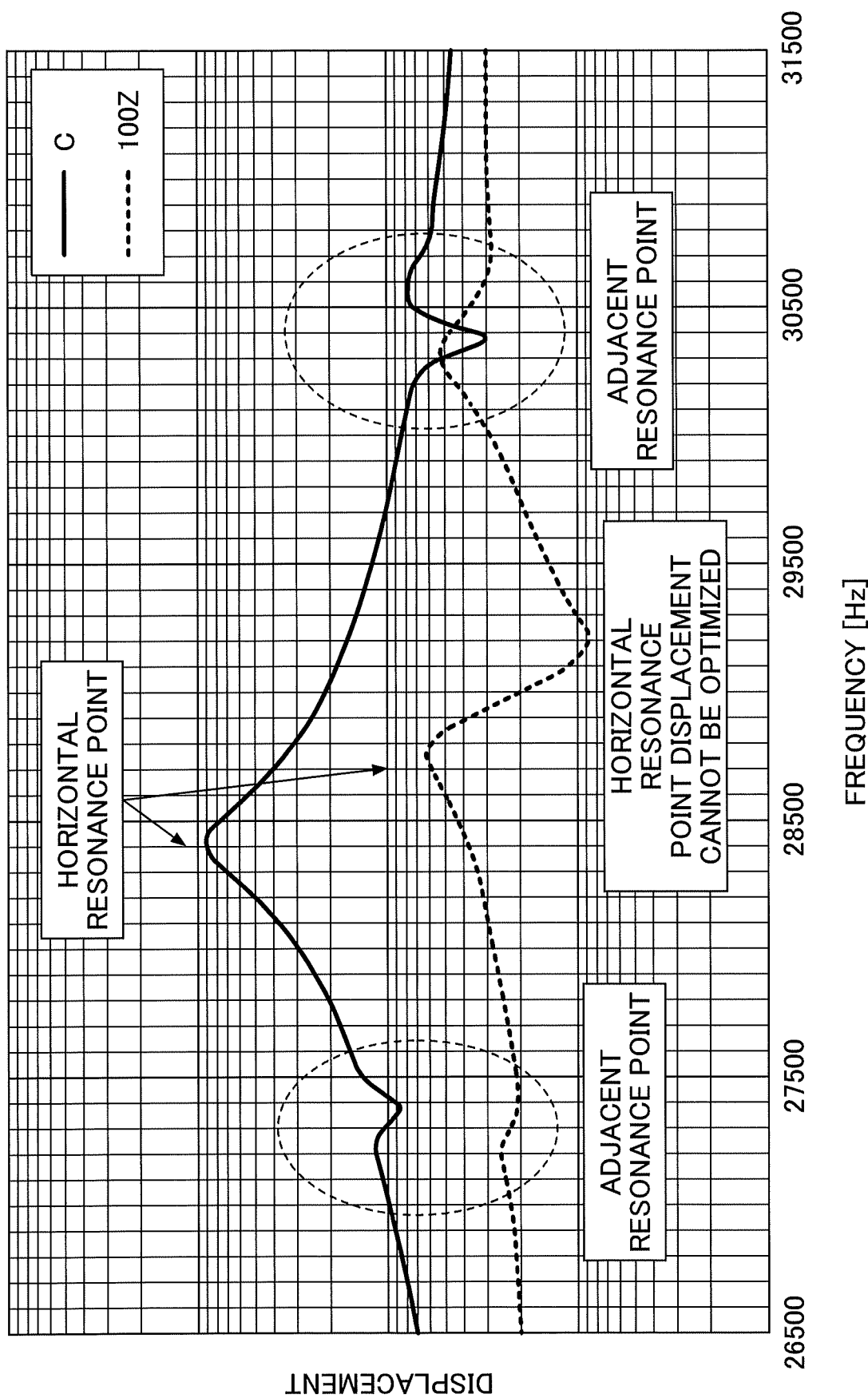
FIG. 26 is a diagram illustrating a displacement-frequency response of the optical scanning device according to the fourth reference example and a displacement-frequency response of the optical scanning device according to the first reference example.

FIG. 26 is a diagram illustrating a displacement-frequency response of the optical scanning device according to the fourth reference example and a displacement-frequency response of the optical scanning device according to the first reference example. The optical scanning device according to the fourth reference example is indicated by 100Z, and the optical scanning device according to the first reference example is indicated by C.

As illustrated in FIG. 26, according to the optical scanning device according to the first reference example (C in FIG. 26), the displacement at the horizontal resonance point is large, and also at the adjacent resonance points, the displacement in characteristic change with respect to the frequency is large. According to the optical scanning device according to the fourth reference example (100Z in FIG. 26), the displacement at the horizontal resonance point is not suppressed. Further, at the adjacent resonance points, the displacement in characteristic change with respect to the frequency is not sufficiently suppressed.

Figure 27:
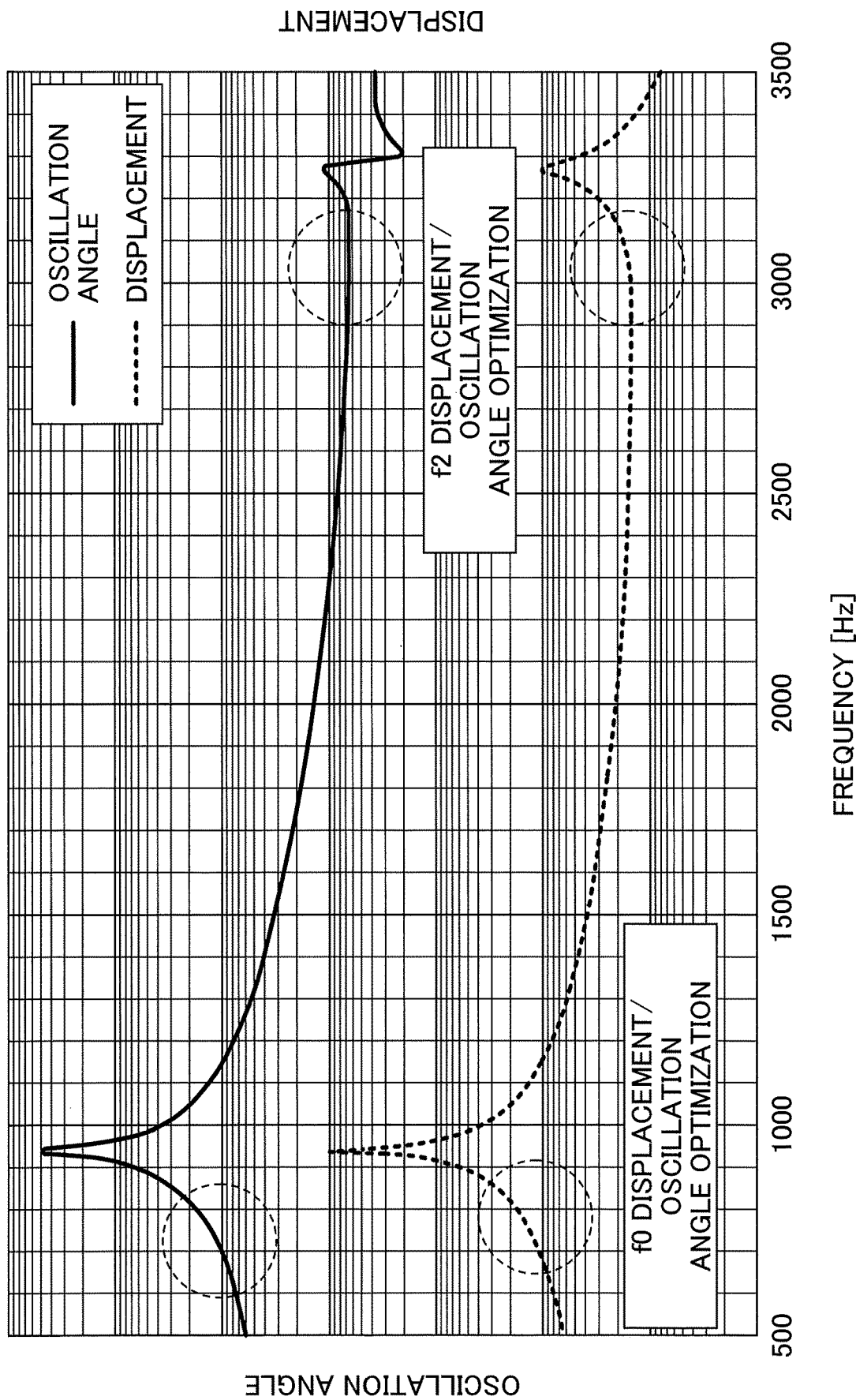
FIG. 27 is a diagram illustrating a frequency response with respect to an oscillation angle and a displacement of the optical scanning device according to the fourth reference example.

FIG. 27 is a diagram illustrating a frequency response with respect to an oscillation angle and a displacement of the optical scanning device according to the fourth reference example.

In the vicinity of 700 Hz to 800 Hz, the displacement of f0 is suppressed. Also, in the vicinity of 3000 Hz, the displacement of f2 and the oscillation angle are suppressed. As described above, due to the counter effect of the vertical drive beams and the weight balance of the movable frame, when the displacement/oscillation angle of f0 and f2 is optimized, even if it is attempted to suppress the displacement in the vertical direction at the horizontal resonance point and its adjacent resonance points at the time of horizontal drive, it cannot be optimized.

According to the optical scanning device according to the present embodiment, in the vicinity of 700 Hz to 800 Hz, the displacement of f0 and the fluctuation of the oscillation angle are suppressed. Also, in the vicinity of 3000 Hz, the displacement of f2 and the fluctuation of the oscillation angle are suppressed. Also, by adding ribs, on the back surfaces of deformation portions of the vertical drive beams in the direction substantially orthogonal to the longitudinal direction of the vertical drive beams (direction of vertical rotation axis V), it is possible to prevent occurrence of mechanical crosstalk while suppressing ringing oscillation due to f0 and f2. Also, even when a resonance frequency variation due to a manufacturing variation or a resonance frequency change due to a temperature change occurs, occurrence of mechanical crosstalk can be prevented while suppressing ringing oscillation.

Although a preferred embodiment has been described above, the present invention is not limited to the embodiment described above, and various variations and substitutions may be made for the embodiment described above without departing from the scope of the present invention. Although, in the above embodiment, an example in which an actuator is applied to an optical scanning device including a mirror has been described, a target object to be driven by an actuator is not limited to a mirror. The present invention can also be applied to an actuator not including a mirror. Also, an optical scanning device according to present invention can also be applied to a projection device.

What is claimed is:

1. An actuator comprising:
   a first drive beam provided to be able to swing and drive a target object around a first axis, a first drive source being formed on a front surface of the first drive beam;
   a second drive beam that has a bellows structure of a zigzag shape as a whole, in which a plurality of beams extending in a direction vertical to a second axis orthogonal to the first axis are included and in which end portions of the beams adjacent with each other are connected at turn portions, and that is provided to be able to swing and drive the target object around the second axis, a second drive source being formed on a front surface of the second drive beam;
   a fixed frame connected to the second drive beam to support the second drive beam;
   first ribs formed on a back surface of the second drive beam and corresponding to respective connection positions of the beams with the turn portions; and
   a second rib formed on the back surface of the second drive beam and at a position away from the connection positions of the beams with the turn portions toward the second axis,
   wherein, in an extending direction of the first axis, a distance between the second rib and the second axis is shorter than a distance between the first ribs and the second axis.

2. The actuator according to claim 1, wherein the rib is formed on at least one of the plurality of beams.

3. The actuator according to claim 1, wherein the rib is formed on two or more of the plurality of beams.

4. The actuator according to claim 1, wherein the rib is formed on an outermost beam of the plurality of beams.

5. The actuator according to claim 4,
   wherein the outermost beam is connected to the fixed frame via a fixed frame connection portion connected to the fixed frame, and wherein at least one rib is formed at a position away from the second axis toward the fixed frame connection portion on the outermost beam.

6. The actuator according to claim 1, wherein the rib has a shape in which a length of the rib in a direction of the second axis is longer than a length of the rib in a direction of the first axis.

7. The actuator according to claim 1, wherein 0.5× BW≤RL≤BW where RL is a length of the rib in a direction of the second axis and BW is a width of the beams in a direction of the second axis.

8. The actuator according to claim 1, wherein 0.5× BW≤RW≤3×BW where RW is a width of the rib in a direction of the first axis and BT is a thickness of the beams.

9. The actuator according to claim 1, wherein the first drive beam, the second drive beam, the fixed frame, and the rib are formed of an SOI (Silicon on Insulator) substrate including an active layer, a buried oxide film, and a support layer.

10. The actuator according to claim 9, wherein a height RT of the rib is equal to a sum of thicknesses of the support layer and the buried oxide film.

11. The actuator according to claim 1, wherein on the back surface of the second drive beam, the first ribs are formed within vicinities of the respective connection positions of the beams with the turn portions.

12. An optical scanning device comprising:
a mirror that has an optical reflection surface;
a mirror support unit configured to support the mirror;
a first drive beam provided to be able to swing and drive the mirror support unit around a first axis, a first drive source being formed on a front surface of the first drive beam;
a second drive beam that has a bellows structure of a zigzag shape as a whole, in which a plurality of beams extending in a direction vertical to a second axis orthogonal to the first axis are included and in which end portions of the beams adjacent with each other are connected at turn portions, and that is provided to be able to swing and drive the mirror support unit around the second axis, a second drive source being formed on a front surface of the second drive beam;
a fixed frame connected to the second drive beam to support the second drive beam;
first ribs formed on a back surface of the second drive beam and corresponding to respective connection positions of the beams with the turn portions; and
a second rib formed on the back surface of the second drive beam and at a position away from the connection positions of the beams with the turn portions toward the second axis,
wherein, in an extending direction of the first axis, a distance between the second rib and the second axis is shorter than a distance between the first ribs and the second axis.

13. The optical scanning device according to claim 12, wherein on the back surface of the second drive beam, the first ribs are formed within vicinities of the respective connection positions of the beams with the turn portions.

* * * * *